United States Patent
Liu et al.

(10) Patent No.: US 10,484,959 B2
(45) Date of Patent: Nov. 19, 2019

(54) POSITIONING TECHNIQUES IN WIRELESS COMMUNICATION SYSTEMS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/985,061

(22) Filed: May 21, 2018

(65) Prior Publication Data
US 2019/0037525 A1 Jan. 31, 2019

Related U.S. Application Data

(60) Provisional application No. 62/539,387, filed on Jul. 31, 2017.

(51) Int. Cl.
*H04L 5/00* (2006.01)
*G01S 5/02* (2010.01)
(Continued)

(52) U.S. Cl.
CPC ......... *H04W 64/003* (2013.01); *G01S 5/0236* (2013.01); *G01S 5/10* (2013.01);
(Continued)

(58) Field of Classification Search
CPC ....... G01S 5/0236; G01S 5/10; H04B 1/7143; H04L 5/0048
See application file for complete search history.

(56) References Cited

U.S. PATENT DOCUMENTS 9,769,621 B2 * 9/2017 Xiao ...................... H04W 64/00
2011/0124347 A1 * 5/2011 Chen ...................... H04W 64/00
455/456.1
(Continued)

FOREIGN PATENT DOCUMENTS

WO    WO-2017029213 A1 *  2/2017  ........... H04L 5/0048

OTHER PUBLICATIONS

Nov. 2016; Ericsson: !!PRS configurations for FeMTC. 3GPP Draft; RI-1611103 PRS Configurations for FEMTC, 3rd Generation Partnership Project (3GPP)s Mobile Competence Centre : 650, Route Des Lucioles ; F-06921 Sophia-Antipolis Cedex ; France.*
(Continued)

*Primary Examiner* — Ashghar H Bilgrami
(74) *Attorney, Agent, or Firm* — Liem T. Do

(57) ABSTRACT

Methods, systems, and devices for wireless communication that support positioning techniques are described. One method may include receiving a positioning reference signal (PRS) configuration; receiving a plurality of PRS transmissions over a shared radio frequency spectrum from a plurality of base stations; and transmitting a measurement report of the PRS transmissions. The PRS transmissions may be received according to the PRS configuration. Another method may include receiving a discovery reference signal (DRS) transmission from a first base station; decoding a cell identifier of the first base station based on the DRS transmission; determining timing information of the first base station based on the DRS transmission; and transmitting a measurement report of the DRS transmission to a second base station.

25 Claims, 17 Drawing Sheets

(51) Int. Cl.
  *G01S 5/10* (2006.01)
  *H04W 64/00* (2009.01)
  *H04B 1/7143* (2011.01)
  *H04W 48/16* (2009.01)

(52) U.S. Cl.
  CPC ......... *H04B 1/7143* (2013.01); *H04L 5/0048* (2013.01); *H04W 48/16* (2013.01)

(56) References Cited

U.S. PATENT DOCUMENTS

| | | | |
|---|---|---|---|
| 2015/0092582 A1* | 4/2015 | Liao | H04J 11/005 370/252 |
| 2015/0270936 A1* | 9/2015 | Han | H04L 5/0048 370/329 |
| 2017/0171857 A1* | 6/2017 | Lee | G01S 5/00 |
| 2017/0276761 A1* | 9/2017 | Park | G01S 5/02 |
| 2017/0289965 A1* | 10/2017 | You | H04W 56/001 |
| 2018/0054699 A1* | 2/2018 | Edge | H04L 5/0048 |
| 2018/0249511 A1* | 8/2018 | Rathonyi | H04W 74/0841 |

OTHER PUBLICATIONS

May 2017; Huawei et al: "Discussion on RSTD measurement for FeMTC", 3GPP Draft; R4-1704999 FEMTC RSTD.*

Ericsson: "PRS Configurations for FeMTC", 3GPP Draft; R1-1611103, 3rd Generation Partnership Project (3GPP), Mobile Competence Centre; 650, Route Des Lucioles; F-06921 Sophia-Anti Polls Cedex; France, vol. RAN WG1, No. Reno, Nevada, USA; Nov. 13, 2016, XP051175085, Retrieved from the Internet: URL:http://www.3gpp.org/ftp/Meetings_3GPP_SYNC/RAN1/Docs/ [retrieved on Nov. 13, 2016], 5 pages.

Ericsson: "Remaining Details of OTDOA Enhancements for FeMTC", 3GPP Draft; R1-1701991 Remaining Details of OTDOA Enhancements for FeMTC, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017 (Feb. 12, 2017), XP051209153, Retrieved from the Internet: URL:http://www.3gpp.org/ftp/Meetings_3GPP_SYNC/RAN1/Docs/ [retrieved on Feb. 12, 2017], 6 pages.

Ericsson: "WF LPP Support for feMTC OTDOA", 3GPP Draft; R2-1702260 WF on Signaling Design for FEMTC OTDOA in LPP, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb 17, 2017 Feb. 20, 2017 (Feb. 20, 2017), XP051237239, Retrieved from the Internet: URL:http://www.3gpp.org/ftp/tsg_ran/WG2_RL2/TSGR2_97/Docs/ [retrieved on Feb. 20, 2017], 7 pages.

Huawei et al., "Discussion on RSTD Measurement for FeMTC", 3GPP Draft; R4-1704999 FEMTC RSTD Measurement, 3rd Generation Partnership Project (3GPP), Mobile Competence Centre; 650, Route Des Lucioles; F-06921 Sophia-Antipolis Cedex; France, vol. RAN WG4, No. Hangzhou, China; May 15, 2017-May 19, 2017 May 6, 2017 (May 6, 2017), XP051266893, Retrieved from the Internet: URL:http://www.3gpp.org/ftp/tsg_ran/WG4_Radio/TSGR4_83/Docs/ [retrieved on May 6, 2017], 4 pages.

International Search Report and Written Opinion—PCT/US2018/033862—ISA/EPO—Sep. 6, 2018 (175542WO).

Qualcomm Incorporated: "OTDOA Enhancements", 3GPP Draft; R1-1702544 OTDOA Enhancements, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13-2017-Feb. 17, 2017 Feb. 7, 2017, XP051221402, Retrieved from the Internet: URL:http://www.3gpp.org/ftp/tsg_ran/WG1_RL1/TSGR1_88/Docs/ [retrieved on Feb. 7, 2017], 3 pages.

* cited by examiner

POSITIONING TECHNIQUES IN WIRELESS COMMUNICATION SYSTEMS

CROSS REFERENCES

The present application for patent claims benefit of U.S. Provisional Patent Application No. 62/539,387 by LIU, et al., entitled "POSITIONING TECHNIQUES IN WIRELESS COMMUNICATION SYSTEMS," filed Jul. 31, 2017, assigned to the assignee hereof, and expressly incorporated by reference in its entirety.

BACKGROUND

The following relates generally to wireless communication, and more specifically to positioning techniques in wireless communication systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, a UE may be a low-cost or low-complexity machine type communication (MTC) device that may communicate with a base station in a narrow subband, or narrowband regions, of a system bandwidth of a wireless communications system. Such UEs may be referred to as narrowband devices. Because of the reduced bandwidth available for communications between a base station and narrowband device, some periodic signals provided by the base station may have reduced opportunities for transmission, which may impact some UE operations. For example, a base station may transmit a positioning reference signal (PRS) at a predetermined time period interval, which may be used to determine an accurate position of the UE. Determining the position of the UE in an enhanced MTC (eMTC) environment may be a challenge using traditional positioning techniques.

SUMMARY

The described techniques relate to improved methods, systems, devices, and apparatuses that supports positioning techniques in wireless communication systems. A base station may be configured to generate a PRS configuration to improve positioning techniques in eMTC environments. The PRS configuration may include a set of hopping frequencies for the PRS transmissions, a cell identifier associated with the base station, a periodicity, a PRS duration, or a time offset of the PRS transmissions. The PRS configuration may be provided to a UE that the base station is serving. As such, the PRS configuration may inform and configure the UE to receive and measure the PRS transmissions accordingly. Upon successfully reception of the PRS transmissions, the UE may generate a measurement report and provide it to the base station for performing a positioning determination. That is, the base station may use the measurement report generated by the UE to determine a location of the UE.

A method for wireless communication at a UE is described. The method may include receiving a PRS configuration; receiving a plurality of PRS transmissions over a shared radio frequency spectrum from a plurality of base stations, where the PRS transmissions are received according to the PRS configuration; and transmitting a measurement report of the PRS transmissions.

An apparatus for wireless communication is described. The apparatus may include means for receiving a PRS configuration; means for receiving a plurality of PRS transmissions over a shared radio frequency spectrum from a plurality of base stations, where the PRS transmissions are received according to the PRS configuration; and means for transmitting a measurement report of the PRS transmissions.

Another apparatus for wireless communication is described. The apparatus may include a processor, memory in electronic communication with the processor. The processor and memory may be configured to receive a PRS configuration; receive a plurality of PRS transmissions over a shared radio frequency spectrum from a plurality of base stations, where the PRS transmissions are received according to the PRS configuration; and transmit a measurement report of the PRS transmissions.

A non-transitory computer readable medium for wireless communication is described. The non-transitory computer-readable medium may include instructions operable to cause a processor to receive a PRS configuration; receive a plurality of PRS transmissions over a shared radio frequency spectrum from a plurality of base stations, where the PRS transmissions are received according to the PRS configuration; and transmit a measurement report of the PRS transmissions.

Some examples of the method, apparatus, and non-transitory computer-readable medium described above for receiving the PRS configuration may further include processes, features, means, or instructions for receiving a set of hopping frequencies for the PRS transmissions. Some examples of the method, apparatus, and non-transitory computer-readable medium described above for receiving the PRS configuration may further include processes, features, means, or instructions for receiving a plurality of cell identifiers associated with the plurality of base stations.

Some examples of the method, apparatus, and non-transitory computer-readable medium described above may further include processes, features, means, or instructions for determining a pseudo random hopping pattern of each base station of the plurality of base stations based at least in part on a received cell identifier of each of the plurality of base stations, where the plurality of PRS transmissions may be received in accordance with the determined pseudo random hopping pattern of each base station.

Some examples of the method, apparatus, and non-transitory computer-readable medium described above for receiving the PRS configuration may further include processes, features, means, or instructions for receiving at least one of: a PRS periodicity, a PRS duration, or a time offset associated with one or more of the plurality of base stations. In some examples of the method, apparatus, and non-transitory computer-readable medium described above, the PRS periodicity is greater than a hopping frame periodicity of the plurality of base stations.

Some examples of the method, apparatus, and non-transitory computer-readable medium described above for receiving the plurality of PRS transmissions may further include processes, features, means, or instructions for tuning away from a serving cell during a measurement gap associated with measuring at least one of the PRS transmissions.

Some examples of the method, apparatus, and non-transitory computer-readable medium described above for receiving the plurality of PRS transmissions may further include processes, features, means, or instructions for receiving all PRS transmissions from all base stations of the plurality of base stations on non-anchor hopping frequencies. Some examples of the method, apparatus, and non-transitory computer-readable medium described above for receiving the plurality of PRS transmissions may further include processes, features, means, or instructions for receiving all PRS transmissions from all base stations of the plurality of base stations on an anchor hopping frequency. Some examples of the method, apparatus, and non-transitory computer-readable medium described above for receiving the plurality of PRS transmissions may further include processes, features, means, or instructions for receiving at least one of the PRS transmissions immediately before or after a serving cell transmission on a non-anchor hopping frequency.

Some examples of the method, apparatus, and non-transitory computer-readable medium described above for receiving the plurality of PRS transmissions may further include processes, features, means, or instructions for receiving the plurality of PRS transmissions from multiple ones of the plurality of base stations during a same set of one or more subframes of the anchor hopping frequency. Some examples of the method, apparatus, and non-transitory computer-readable medium described above for receiving the plurality of PRS transmissions may further include processes, features, means, or instructions for receiving at least one PRS transmission during a PRS occasion comprising a plurality of repetitions of PRS subframes.

Some examples of the method, apparatus, and non-transitory computer-readable medium described above may further include processes, features, means, or instructions for performing combining of the plurality of repetitions of PRS subframes within the PRS occasion; and detecting a transmission and estimating a delay jointly based at least in part on the combining. In some examples of the method, apparatus, and non-transitory computer-readable medium described above, at least one of the plurality of base stations comprises a dedicated reference signal base station.

A method for wireless communication at a UE is described. The method may include receiving a discovery reference signal (DRS) transmission from a first base station, the DRS transmission comprising a plurality of time repetitions of a DRS, decoding a cell identifier of the first base station based at least in part on the DRS transmission, determining timing information of the first base station based at least in part on the DRS transmission, and transmitting a measurement report of the DRS transmission to a second base station, the measurement report comprising the cell identifier and the timing information of the first base station.

An apparatus for wireless communication is described. The apparatus may include means for receiving a DRS transmission from a first base station, the DRS transmission comprising a plurality of time repetitions of a DRS, means for decoding a cell identifier of the first base station based at least in part on the DRS transmission, means for determining timing information of the first base station based at least in part on the DRS transmission, and means for transmitting a measurement report of the DRS transmission to a second base station, the measurement report comprising the cell identifier and the timing information of the first base station.

Another apparatus for wireless communication is described. The apparatus may include a processor, memory in electronic communication with the processor, and instructions stored in the memory. The instructions may be operable to cause the processor to receive a DRS transmission from a first base station, the DRS transmission comprising a plurality of time repetitions of a DRS, decode a cell identifier of the first base station based at least in part on the DRS transmission, determine timing information of the first base station based at least in part on the DRS transmission, and transmit a measurement report of the DRS transmission to a second base station, the measurement report comprising the cell identifier and the timing information of the first base station.

A non-transitory computer readable medium for wireless communication is described. The non-transitory computer-readable medium may include instructions operable to cause a processor to receive a DRS transmission from a first base station, the DRS transmission comprising a plurality of time repetitions of a DRS, decode a cell identifier of the first base station based at least in part on the DRS transmission, determine timing information of the first base station based at least in part on the DRS transmission, and transmit a measurement report of the DRS transmission to a second base station, the measurement report comprising the cell identifier and the timing information of the first base station.

A method of wireless communication at a base station is described. The method may include transmitting a positioning reference signal (PRS) configuration to a user equipment (UE), transmitting a plurality of PRS transmissions over a shared radio frequency spectrum, wherein the PRS transmissions are transmitted according to the PRS configuration, and receiving a measurement report of the PRS transmissions from the UE.

An apparatus for wireless communication is described. The apparatus may include means for transmitting a PRS configuration to a UE, means for transmitting a plurality of PRS transmissions over a shared radio frequency spectrum, wherein the PRS transmissions are transmitted according to the PRS configuration, and means for receiving a measurement report of the PRS transmissions from the UE.

Another apparatus for wireless communication is described. The apparatus may include a processor, memory in electronic communication with the processor, and instructions stored in the memory. The instructions may be operable to cause the processor to transmit a PRS configuration to a UE, transmit a plurality of PRS transmissions over a shared radio frequency spectrum, wherein the PRS transmissions are transmitted according to the PRS configuration, and receive a measurement report of the PRS transmissions from the UE.

A non-transitory computer readable medium for wireless communication is described. The non-transitory computer-readable medium may include instructions operable to cause a processor to transmit a PRS configuration to a UE, transmit a plurality of PRS transmissions over a shared radio frequency spectrum, wherein the PRS transmissions are transmitted according to the PRS configuration, and receive a measurement report of the PRS transmissions from the UE.

Some examples of the method, apparatus, and non-transitory computer-readable medium described above for transmitting the PRS configuration may further include processes, features, means, or instructions for transmitting a set of hopping frequencies for the PRS transmissions. Some examples of the method, apparatus, and non-transitory computer-readable medium described above for transmitting the PRS configuration may further include processes, features, means, or instructions for transmitting a cell identifier associated with the base station. Some examples of the method, apparatus, and non-transitory computer-readable medium described above for transmitting the PRS configuration may further include processes, features, means, or instructions for transmitting at least one of: a PRS periodicity, a PRS duration, or a time offset.

In some examples of the method, apparatus, and non-transitory computer-readable medium described above, the base station may be a serving cell. In some examples of the method, apparatus, and non-transitory computer-readable medium described above, the base station may be a dedicated reference signal base station.

Some examples of the method, apparatus, and non-transitory computer-readable medium described above for transmitting the plurality of PRS transmissions may further include processes, features, means, or instructions for transmitting all PRS transmissions on non-anchor hopping frequencies. Some examples of the method, apparatus, and non-transitory computer-readable medium described above for transmitting the plurality of PRS transmissions may further include processes, features, means, or instructions for transmitting all PRS transmissions on an anchor hopping frequency. Some examples of the method, apparatus, and non-transitory computer-readable medium described above for transmitting the plurality of PRS transmissions may further include processes, features, means, or instructions for transmitting at least one of the PRS transmissions on a non-anchor hopping frequency.

DETAILED DESCRIPTION

Figure 1:
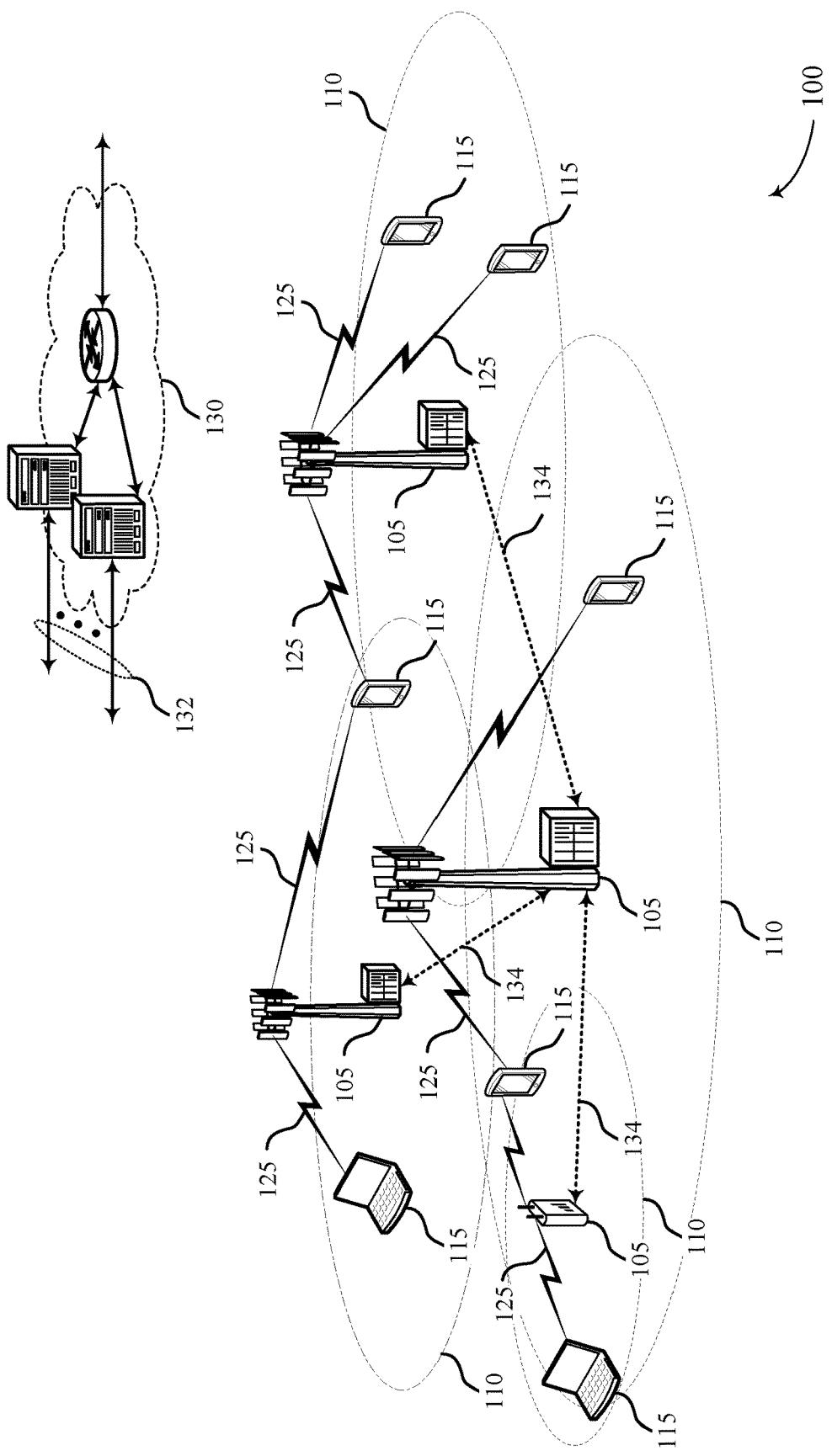
FIG. 1 illustrates an example of a system for wireless communication that supports positioning techniques in wireless communication systems in accordance with aspects of the present disclosure.

In some deployments of eMTC, a number of base stations may be configured to transmit PRSs to one or more network components (e.g., UEs, sensors, Internet of Things (IoT) devices) in the eMTC environment. These base stations may be dedicated positioning eNBs for transmitting PRSs or DRSs. That is, these dedicated positioning eNBs may not be configured to transmit other types of signals, such as a primary synchronization signal (PSS), a secondary synchronization signal (SSS), or a cell-specific reference signal (CRS), downlink or uplink data traffic, etc. to other network components.

Some deployments of eMTC may include a serving base station and one or more neighboring base stations, each in communication with a UE. The serving base station may be configured to perform multiple operations (e.g., providing downlink and uplink grants, providing uplink power control commands, exchanging control information and data with other network components, etc.). In contrast to the serving base station, the neighboring base stations may be configured to perform a single operation. For example, a neighboring base station may be configured to perform PRS or DRS transmissions. In some cases, one or more of the neighboring base station may be dedicated reference signal base stations as discussed above.

The serving base station may generate a PRS configuration. The PRS configuration may include a set of hopping frequencies for one or more PRS transmissions from the serving base station and one or more neighboring base stations. The serving base station may also provide some coordination of frequency hopping pattern of the neighboring base stations, to enable the UE to be able to detect and estimate the PRS transmissions concurrently. The PRS configuration may also include a cell identifier associated with the serving and neighboring base stations. The PRS configuration may, additionally or alternatively, include a PRS periodicity, a PRS duration, or a time offset. The PRS periodicity may indicate time repetitions of a PRS transmission. The UE may receive the PRS configuration from the serving base station.

The serving base station may transmit a plurality of PRS transmissions over a shared radio frequency spectrum to the UE, according to the PRS configuration. As such, the UE may also receive the plurality of PRS transmissions over the shared radio frequency spectrum according to the PRS configuration. In some cases, the serving base station and neighboring base stations may transmit all PRS transmissions on non-anchor hopping frequencies or on an anchor hopping frequency. In some cases, at least one PRS transmission may be transmitted on a non-anchor hopping frequency or on an anchor hopping frequency.

The PRS configuration may configure the UE to perform a measurement of one or more PRS transmissions from the serving base station and the neighboring base stations. For example, the UE may receive and measure all PRS transmissions on non-anchor hopping frequencies or anchor hopping frequencies based on the PRS configuration. The UE may generate a measurement report and transmit it to the serving base station. The serving base station may use the measurement report to determine a position of the UE.

Aspects of the disclosure are initially described in the context of a wireless communications system. Exemplary UEs and base stations (e.g., evolved NodeBs (eNBs), next generation NodeBs (gNBs)), systems, and process flow that support positioning techniques are then described. Aspects of the disclosure are further illustrated by and described with reference to apparatus diagrams, system diagrams, and flowcharts that relate to positioning techniques in wireless communication systems.

FIG. 1 illustrates an example of a system 100 for wireless communication that supports positioning techniques in wireless communication systems in accordance with aspects of the present disclosure. The system 100 includes base stations 105, UEs 115, and a core network 130. In some examples, the system 100 may be an LTE network, an LTE-Advanced (LTE-A) network, or a NR network. In some cases, the system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The system 100 may include base stations 105 of different types (e.g., macro or small cell base stations). UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base station 105 may transmit a PRS configuration to UE 115. UE 115 may receive the PRS configuration from base station 105 via communication links 125. Base station 105 may transmit a plurality of PRS transmissions over a shared radio frequency spectrum to UE 115 via communication links 125. UE 115 may receive a plurality of PRS transmissions over a shared radio frequency spectrum from a plurality of base stations 105. The PRS transmissions may be received according to the PRS configuration. UE 115 may generate a measurement report and transmit it to the base station 105 based on the PRS transmissions.

In some examples, system 100 may be associated with an eMTC environment. In some deployments of eMTC, a number of base stations 105 may be configured to transmit PRS transmissions to one or more network components (e.g., UEs, sensors, IoT devices) in the eMTC environment. These base stations 105 may be low-cost positioning eNBs for performing PRS transmission only. That is, these low-cost positioning eNBs may not be configured to transmit other types of signals, such as a PSS, a SSS, or a CRS, downlink or uplink data traffic, etc. to other network components. In system 100, base station 105 may be a service cell. For example, base station 105 may be a serving base station for UE 115. Base station 105 may also be configured to perform multiple operations (e.g., provide downlink and uplink grants, uplink power control commands, exchange control information and data with other network components, etc.). In system 100, a neighboring base station may have a neighboring geographic coverage area 110. In contrast to base station 105, a neighboring base station may be configured to perform a single operation. For example, a neighboring base station may be configured to perform PRS transmissions. Additionally or alternatively, neighboring base station may be configured to perform DRS transmissions. As such, neighboring base station may be dedicated reference signal base stations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and the system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. The system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The system 100 may also operate in an extremely high frequency (EHF) region of the spectrum (e.g., from 30 GHz to 300 GHz), also known as the millimeter band. In some examples, the system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, the system 100 may utilize both licensed and unlicensed radio frequency spectrum bands. For example, the system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these.

Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the system 100, and may be referred to as a transmission time interval (TTI). In other cases, a smallest scheduling unit of the system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth.

The system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, the system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
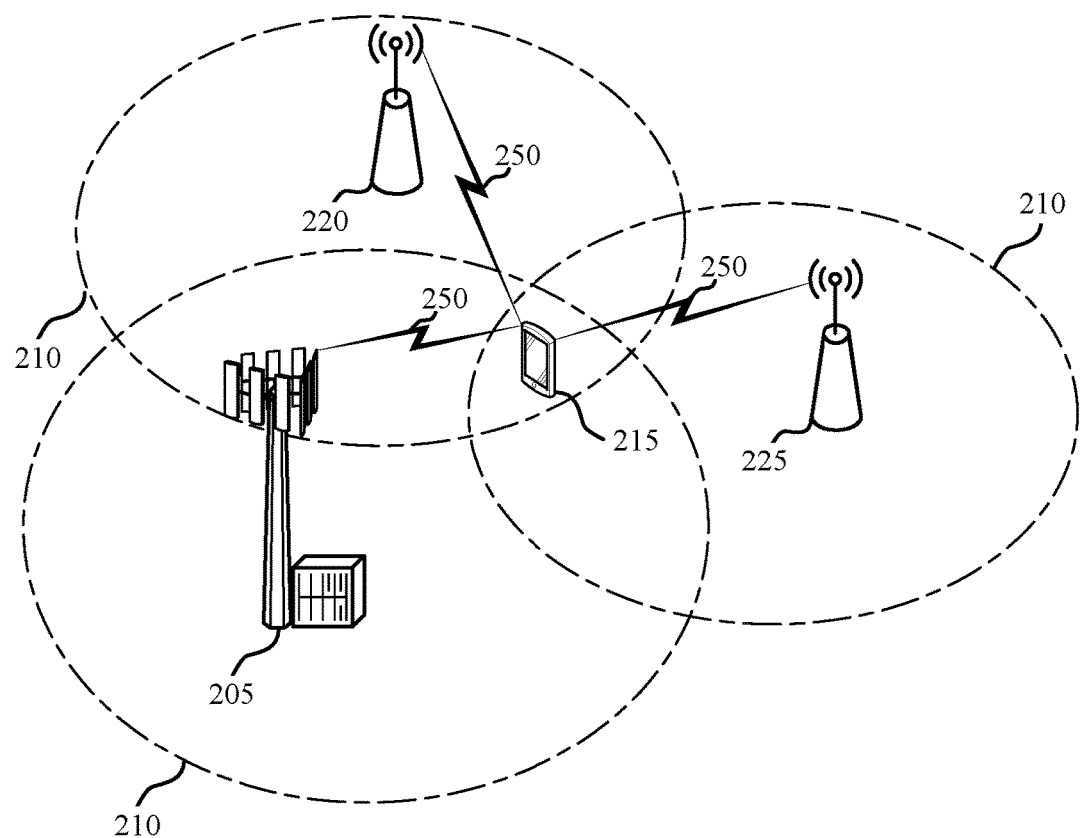
FIG. 2 illustrates an example of a system that supports positioning techniques in wireless communication systems in accordance with aspects of the present disclosure.

FIG. 2 illustrates an example of a system 200 that supports positioning techniques in wireless communication systems in accordance with various aspects of the present disclosure. In some examples, system 200 may implement aspects of system 100. System 200 may include a base station 205, a UE 215, a network device 220, and a network device 225, which may be examples of the corresponding devices described with reference to FIG. 1.

System 200 may operate according to a radio access technology (RAT) such as a 5G or NR RAT, although techniques described herein may be applied to any RAT and to systems that may concurrently use two or more different RATs. In some examples, system 200 may be associated with an eMTC environment. The eMTC environment may have a target bandwidth of 2.4 GHz in the ISM band. The ISM band includes a number of reserved radio frequencies intended for scientific, medical and industrial communications. In some deployments of eMTC, a number of base stations may be configured to transmit PRS transmissions to one or more network components (e.g., UEs, sensors, IoT devices) in the eMTC environment. These base stations may be low-cost positioning eNBs for performing PRS transmission only. That is, these low-cost positioning eNBs may not be configured to transmit other types of signals, such as a PSS, a SSS, or a CRS, downlink or uplink data traffic, etc. to other network components in the eMTC environment.

In system 200, base station 205 may be a service cell. For example, base station 205 may be a serving base station for UE 215. Base station 205 may also be configured to perform multiple operations (e.g., provide downlink and uplink grants, uplink power control commands, exchange control information and data with other network components, etc.). In system 200, network device 220 and network device 225 may be a neighboring cell with corresponding sectors 210. In contrast to base station 205, network device 220 and network device 225 may be configured to perform a single operation. For example, network device 220 and network device 225 may be configured to perform PRS transmissions. Additionally or alternatively, network device 220 and network device 225 may be configured to perform DRS transmissions. In these cases, network device 220 and network device 225 may be dedicated reference signal base stations.

Base station 205, network device 220, and network device 225 may be associated with a same or different network. Network device 220 and network device 225 may also be coordinated (i.e., time synchronized) with the network. In some examples, network device 220 and network device 225 may have a unique cell identifier. The cell identifier may be a random generated number or may be assigned by a network operator. In some cases, because network device 220 and network device 225 are configured to perform a single operation, i.e., exchange specific wireless communication signals with other network components, network device 220 and network device 225 may not support downlink and uplink data traffic. In some examples, base station 205, network device 220, and network device 225 may be of different types (e.g., macro or small cell base stations). UE 215 described herein may be able to communicate with various types of base station 205, network device 220, and network device 225 including macro eNBs, small cell eNBs, gNBs, relay base stations, dedicated reference signal base stations, and the like. For example, base station 205, network device 220, and network device 225 may communicate with UE 215 via bi-directional links 250.

Network device 220 and network device 225 may be an eMTC device that may or may not employ frequency hopping for communication. In some examples, network device 220 and network device 225 may employ frequency hopping based on an indication of frequency hopping pattern received from base station 205. In some examples, the indication of frequency hopping pattern may be received in a system information block (SIB), and may include a frequency hopping offset. The frequency hopping offset may be specified in terms of a number of subframes (e.g., subbands or symbols). Base station 205 may generate a PRS configuration. The PRS configuration may include a set of hopping frequencies for one or more PRS transmissions from base station 205 to UE 215. Base station 205 may also provide some coordination of frequency hopping pattern of network device 220 and network device 225, to enable UE 215 to be able to detect and estimate the PRS transmissions from both network device 220 and network device 225 concurrently. Base station 205, network device 220, and network device 225 may each transmit PRS transmissions in a same frequency range without disturbing a PRS transmission from the other device (e.g., base station 205, network device 220, and network device 225).

In some cases, the PRS configuration may also include a cell identifier associated with base station 205. The cell identifier may be a unique number that identifies base station 205 or a sector of base station 205 (i.e., sector 210). UE 215 may determine a pseudo random hopping pattern associated with each of base station 205, network device 220, and network device 225 using the cell identifiers of base station 205, network device 220, and network device 225. The PRS configuration may, additionally or alternatively, include a PRS periodicity, a PRS duration, or a time offset. The PRS periodicity may indicate time repetitions of a PRS transmission. For example, for multiple subframes of a frame (e.g., subframes 0 to 9), base station 205 may perform a PRS transmission (i.e., transmit a PRS) by selecting specific subframes (e.g., subframe 1 and subframe 6) for transmission of PRSs. In some cases, the PRS configuration may configure UE 215 to perform a measurement of one or more PRS transmissions. For example, UE 215 may be aware of the subframes that base station 205 uses to transmit PRS transmissions, and as such perform measurements on those subframes.

Since, in the example of FIG. 2, base station 205 may be a serving base station for UE 215, base station 205 may also be configured with positioning information and timing information of network device 220 and network device 225. The positioning information may include a geolocation of network device 220 and network device 225. The timing information may include a PRS periodicity, a PRS duration, or a time offset or any combination thereof, associated with PRS transmissions performed by network device 220 and network device 225. That is, base station 205 may be aware of each subframe of a plurality of subframes (e.g., OFDM symbol and sub-carriers) used by network device 220 and network device 225 to transmit a PRS transmission; or in some cases a DRS transmission. Base station 205 may provide the timing information to UE 215 in the PRS configuration. UE 215 may be able to identify and decode the PRS transmissions from network device 220 and network device 225 using the timing information provided by base station 205. In some examples, base station 205 may transmit the PRS configuration in a master information block (MIB) or a SIB. Base station 205 may transmit the PRS configuration to UE 215 during a RRC configuration procedure. In some examples, base station 205 may transmit the PRS configuration in an RRC message.

Base station 205, network device 220, and network device 225 may transmit a plurality of PRS transmissions over a shared radio frequency spectrum to UE 215, via bi-directional links 250. In some examples, the plurality of PRS transmission may be transmitted to UE 215 according to the PRS configuration. For example, base station 205, network device 220, and network device 225 may transmit all PRS transmissions on non-anchor hopping frequencies or on an anchor hopping frequency. In some cases, at least one PRS transmission may be transmitted on a non-anchor hopping frequency or on an anchor hopping frequency. UE 215 may receive the plurality of PRS transmissions over the shared radio frequency spectrum to UE 215, via bi-directional links 250. In some examples, the plurality of PRS transmissions may be received by UE 215 according to the PRS configuration. For example, UE 215 may receive all the PRS transmissions from all base station 205, network device 220, and network device 225 on non-anchor hopping frequencies. In some cases, UE 215 may receive at least one of the PRS transmissions from network device 220 or network device 225 immediately before or after base station 205 performs a PRS transmission on a non-anchor hopping frequency.

UE 215 may in some cases, receive PRS transmissions from base station 205, network device 220, and network device 225 during a same one or more subframes. For example, base station 205 may transmit a PRS transmission on a first subband during a first symbol of a first subframe, network device 220 may transmit a PRS transmission on a second subband during the first symbol of the first subframe, and network device 225 may transmit a PRS transmission on a third subband during the first symbol of the first subframe.

In some eMTC deployments, PRS transmissions may be guaranteed. As such, coherent combining of PRS occasions (i.e., separated by one PRS transmission period) may be allowed to achieve a higher signal to noise ratio (SNR) for delay estimation. In some examples, PRS transmission in anchor hopping frequency or non-anchor hopping frequency may be subject to LBT procedure and a PRS transmission interval may be restricted based on a network configured setting. In addition, detection of neighboring cell PRS transmissions may be challenging due to path loss of the PRS transmission. As such to obviate the challenges of a limited PRS transmission interval and effects of path loss, system 200 may provide a PRS occasion that may include multiple repetitions of PRS subframes. This may allow one-shot neighbor cell PRS or DRS transmission detection and delay estimation. In some cases, system 200 may support repetition of PRS subframe per PRS occasion to allow neighboring cell transmission detection in low SNR (e.g. four repetitions may be used for a maximum coupling loss (MCL) 136 dB, Tx power 20 dBm, noise figure (NF)=9 dB). In some examples, the delay estimation (e.g., a reference signal time difference (RSTD)) may be based on the PRS occasion.

UE 215 may receive at least one PRS transmission during a PRS occasion. The PRS occasion may include a number of repetitions of PRS subframes. UE 215 may perform linking of the number of repetitions of PRS subframes within the PRS occasion, and detect a transmission and estimate a delay jointly based on the linking. This may be achieved by having base station 205 provide the cell identifiers of network device 220 and network device 225, a channel list, the PRS configuration including the frequency hopping pattern, to UE 215. UE 215 may determine the frequency hopping pattern and PRS transmission sequence using the cell identifiers. In addition, UE 215 may also identify the timing information and resources from the PRS configuration. UE 215 may descramble transmission sequence, and perform coherent combining across all PRS repetition subframe within one PRS occasion for joint transmission detection and delay estimation.

Figure 3:
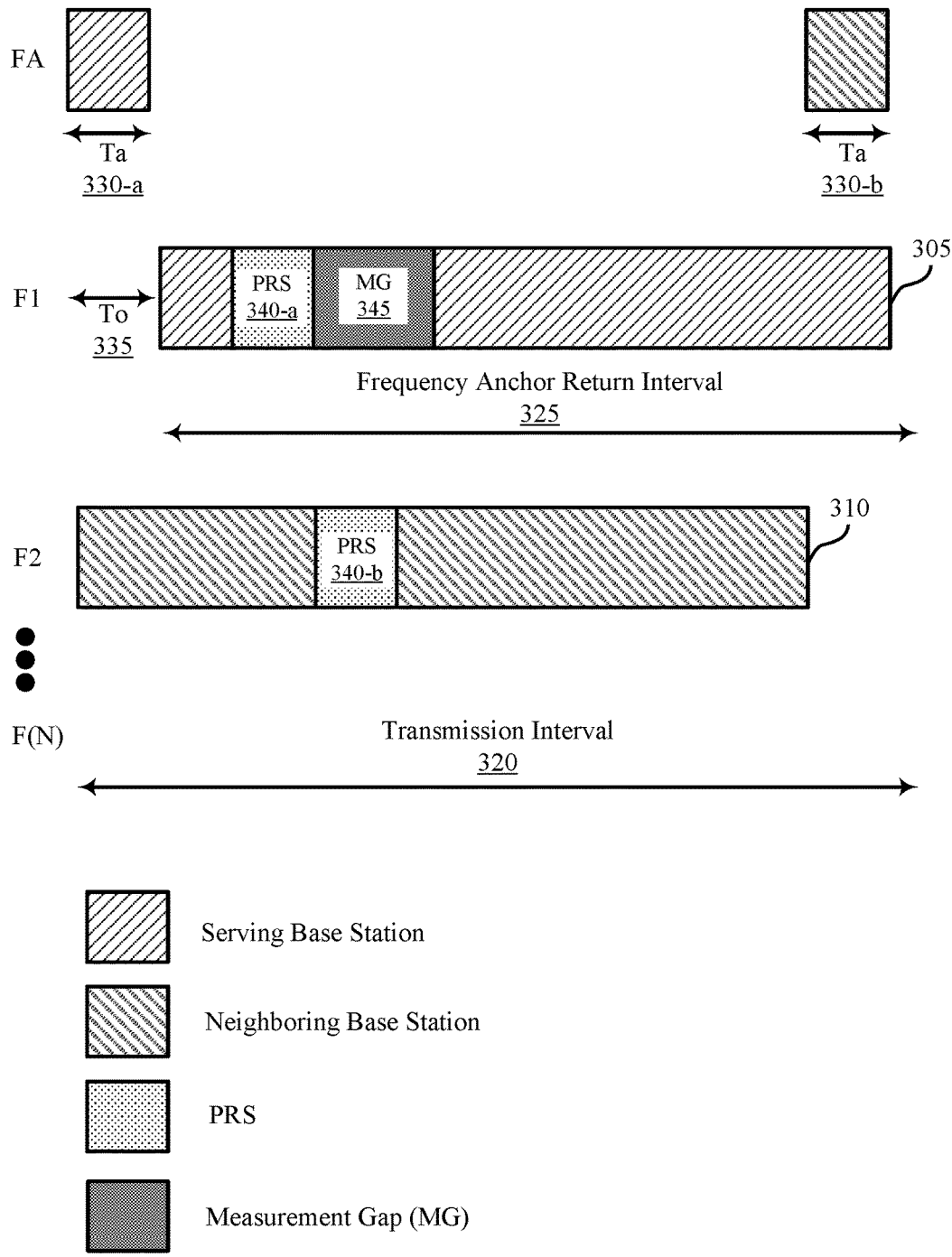
FIG. 3 illustrates an example of a configuration that supports positioning techniques in wireless communication systems in accordance with aspects of the present disclosure.

FIG. 3 illustrates an example of a configuration 300 that supports positioning techniques in wireless communication systems in accordance with aspects of the present disclosure. In some examples, configuration 300 may implement aspects of system 100 and 200. Configuration 300 may illustrate a frame structure that supports receiving PRS transmissions in wireless communication systems. For example, configuration 300 may include a serving base station frame structure 305 and a neighboring base station frame structure 310. The serving base station frame structure 305 may be associated with base station 205 described with reference to FIG. 2. The neighboring base station frame structure 310 may be associated with network device 220 and network device 225 described with reference to FIG. 2.

Configuration 300 may include a transmission interval 320 and a frequency anchor return interval 325. The frequency anchor return interval 325 may be based on a number of non-anchor hopping frequencies (i.e., $T_{hop} \cdot N$, where N is a number of non-anchor hopping frequencies). In some cases, the frequency anchor return interval 325 (i.e., $T_{hop} \cdot N$) may be greater or equal to an anchor hopping frequency interval (i.e., $T_{anch} \cdot N_{hop}$). In some examples, long PRS occasions may be configured for one-short detection and delay estimation. For PRS transmission by network device 220 and network device 224 on an non-anchor hopping frequency, multiple PRS occasions in one hopping frequency frame may be configured with large measurement gaps or multiple measurement gaps with multiple frequency retuning. In some examples, a period of a PRS occasion may be defined by a multiple of $(T_{anch}+N \cdot T_{hop})$. In some cases, a single PRS occasion may be configured per frame.

A serving base station may transmit a PRS transmission on an anchor frequency (e.g., FA in FIG. 3). For example, base station 205 may transmit a PRS transmission on an anchor frequency during a transmission anchor (Ta) interval 330-a. Additionally or alternatively, network device 220 or network device 225, as neighboring base stations may also transmit a PRS transmission on an anchor frequency during a Ta interval 330-b. In some cases, because base station 205, network device 220, and network device 225 transmit a PRS transmission on an anchor frequency, less resources may be utilized. That is, a smaller portion of a subframe (e.g., subcarrier and symbol) may be used. For example, the transmission interval 320 may have a duration of 85 ms, and the Ta interval 330-a may have a duration of 5 ms. As such, in the case that the serving or neighboring base station transmits a PRS transmission on an anchor frequency, approximately 5% of the transmission interval 320 may be used.

Base station 205, network device 220, and network device 225 may, in some cases, transmit a PRS transmission on non-anchor frequencies. For example, base station 205 may transmit a PRS transmission 340-a on a non-anchor frequency (e.g., F1) after a time offset (To) 335. Base station 205 may generate a measurement gap for network device 220 and network device 225. For example, base station 205 may generate measurement gap 345. Network device 220 and network device 225 may transmit a PRS transmission 340-b during the measurement gap 345 using a different non-anchor frequency (e.g., F2). Because the base station 205, network device 220, and network device 225 transmits a PRS transmission on non-anchor frequencies, more resources may be consumed. That is, a larger portion of a subframe (e.g., subcarrier and symbol) or frame may be used. For example, the transmission interval 320 may have a duration of 85 ms, and the frequency anchor return interval 325 associated with the PRS transmission on non-anchor frequencies may have a duration of 80 ms, i.e., approximately 94% of the transmission interval 320 may be used.

In some examples, the measurement gap 345 may allow UE 215 to hop to a frequency e.g., F2) used by network device 220 and network device 225 to measure the PRS transmission (e.g., PRS 340-b). That is, UE 215 may tune away from base station 205 during measurement gap 345. In some cases, UE 215 may be aware of the neighboring base station frame structure 310. For example, base station 205 may transmit information of the neighboring base station frame structure 310 to UE 215. In some examples, base station 205 may provide a pseudo-random hopping pattern, a channel list (e.g., a list of frequencies used to transmit the PRS transmissions), PRS configuration of neighboring cells (i.e., network device 220 and network device 225) to UE 215. The pseudo-random hopping pattern may be based on the cell identifiers of base station 205, network device 220, and network device 225. As such, UE 215 may be aware of resources (e.g., resource elements of a subframe) used by the neighboring base station (e.g., network device 220 and network device 225) to transmit the PRS transmissions.

Returning to FIG. 2, base station 205 may also transmit a DRS transmission, to UE 215. The DRS transmission may, in some cases, include a number of time repetitions of a DRS. That is, base station 205 may perform multiple DRS transmissions during a transmission interval. In an example, base station 205 may transmit a DRS transmission every n number of subframes or OFDM symbols of a slot during a transmission interval, where n is a positive value. For example, for a single slot (including OFDM symbols 0 to 7) of a subframe, base station 205 may perform a DRS transmission at OFDM symbol 0 and OFDM symbol 4. Alternatively, for multiple subframes of a frame (e.g., subframes 0 to 9), base station 205 may perform a DRS transmission at subframe 1 and subframe 6. Additionally, base station 205 may transmit a DRS transmission every m sub-carriers, where m is a positive value. In some cases, base station 205 may transmit a DRS transmission on an anchor channel, e.g., an anchor frequency. As such, use of coverage enhanced DRS may support and improve positioning techniques in a wireless communication system. That is, by having base station 205 perform multiple DRS transmissions during a transmission interval, positioning techniques in a wireless communication system may be improved. UE 215 may receive the transmitted DRS transmission from base station 205. In some examples, a DRS transmission may include a plurality of time repetitions of a DRS transmission. For example, for multiple subframes of a frame (e.g., subframes 0 to 9), UE 215 may receive a DRS transmission at subframe 1 and subframe 6.

UE 215 may decode a cell identifier of base station 205 based on the received DRS transmission. The cell identifier may be a unique number that identifies base station 205 or a sector (e.g., coverage area) of base station 205. In some cases, the cell identifier may be a physical layer cell identifier. Base station 205 may perform the DRS transmission on an assigned antenna port (e.g., antenna port 6). The assigned antenna port may be defined such that a channel over which an OFDM symbol on the antenna port is communicated to UE 215 may be inferred from the channel over which another OFDM symbol on the same assigned antenna port is communicated. As such, UE 215 may demodulate and decode the DRS transmission which is transmitted over the assigned antenna port to decode and identify the cell identifier of base station 205.

UE 215 may determine timing information of base station 205 based on the received DRS transmission. In some cases, UE 215 may determine timing information of base station 205 by measuring an reported observed time difference of arrival (OTDOA) between multiple DRS transmissions. UE 215 may determine timing information of base station 205 by measuring a RSTD. The RSTD may be a timing difference between a subframe received from base station 205 and a subframe received from network device 220 and network device 225. In some cases, UE 215 may measure a RSTD without a serving cell configuration. For example, UE 215 may measure a RSTD between two subframes received from base station 205. As such, the timing information of base station may be an OTDOA or a RSTD.

UE 215 may generate a measurement report of the DRS transmission. The measurement report may include the cell identifier and the timing information of base station 205. In some cases, UE 215 may generate the measurement report based on a reporting configuration. The reporting configuration may be network operator-specific. UE 215 may transmit the measurement report to base station 205. Base station 205 may use the measurement report to determine a position of UE 215 in system 200.

Figure 4:
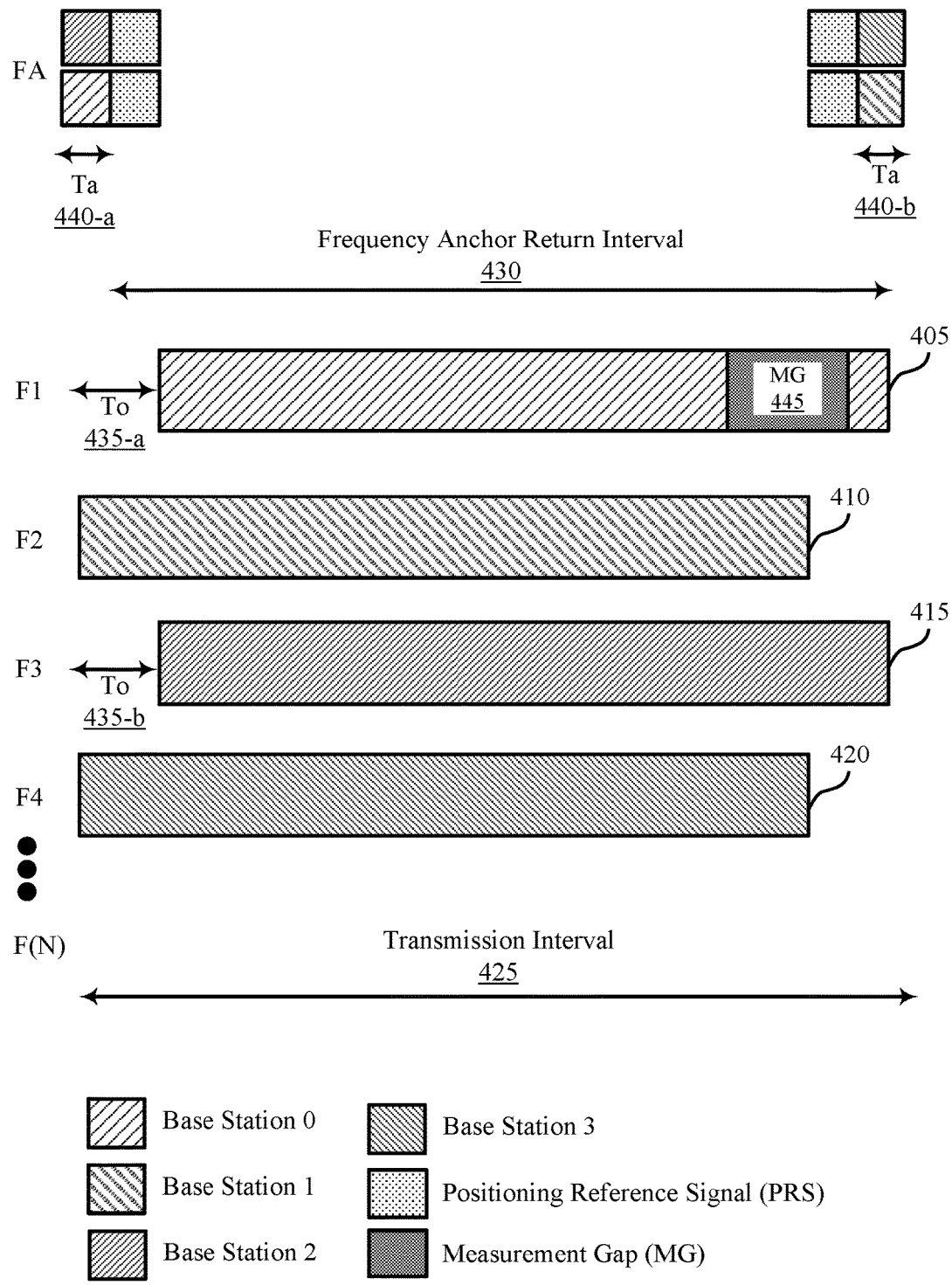
FIG. 4 illustrates an example of a configuration that supports positioning techniques in wireless communication systems in accordance with aspects of the present disclosure.

FIG. 4 illustrates an example of a configuration 400 that supports positioning techniques in wireless communication systems in accordance with various aspects of the present disclosure. In some examples, configuration 400 may implement aspects of system 100. Configuration 400 may illustrate a frame structure that supports receiving PRS transmissions in wireless communication systems. For example, configuration 400 may include a serving base station frame structure 405 and neighboring base station frame structures 410, 415, and 420. The serving base station frame structure 405 may be associated with base station 205 described with reference to FIG. 2. The neighboring base station frame structures 410, 415, and 420 may be associated with network device 220 and network device 225 described with reference to FIG. 2.

In the example of FIG. 4, configuration 400 may depict a scenario where all base stations transmit PRS transmissions on a designated anchor frequency (e.g., FA) during a Ta interval 440-a and Ta interval 440-b. A designated anchor hopping frequency may include a DRS anchor frequency or another anchor hopping frequency without the DRS. In some cases, base station 205 or network device 220 and network device 225 may transmit a PRS transmission on an anchor hopping frequency before the start or after the end of transmission interval 425. In some cases, for PRS transmission on a DRS anchor hopping frequency, the PRS transmission may follow or lead the DRS transmission, i.e., both the DRS transmission and the PRS transmission may share a same LBT maximum channel occupancy time (MCOT).

Base station 0 and base station 2 may transmit a PRS transmission on non-anchor frequencies (i.e., F1 and F3) after a time offset (To) 435-a and To 435-b. For neighboring cell PRS transmission measurements, a base station may configure per-base station measurement gaps. For example, a base station 205 may configure a measurement gap 445. UE 215 may use the measurement gap 445 to return on non-anchor hopping frequencies to measure the DRS or PRS transmission of base station 0 (e.g. network device 220). For neighboring cells which may have a same anchor hopping frequency pattern (e.g. base station 0 and base station 2, or base station 1 and base station 3), the PRS transmission of base station 0 and base station 3 may share a same subframe in an anchor channel. Base station 1 and base station 3 may transmit a PRS transmission on non-anchor frequencies (i.e., F2 and F4). In this case, all the base stations may transmit PRS on an anchor frequency (e.g., FA). In some cases, no measurement gap may be used if the anchor hopping frequency pattern is same as a serving base station (e.g., base station 0 and base station 2).

Figure 5:
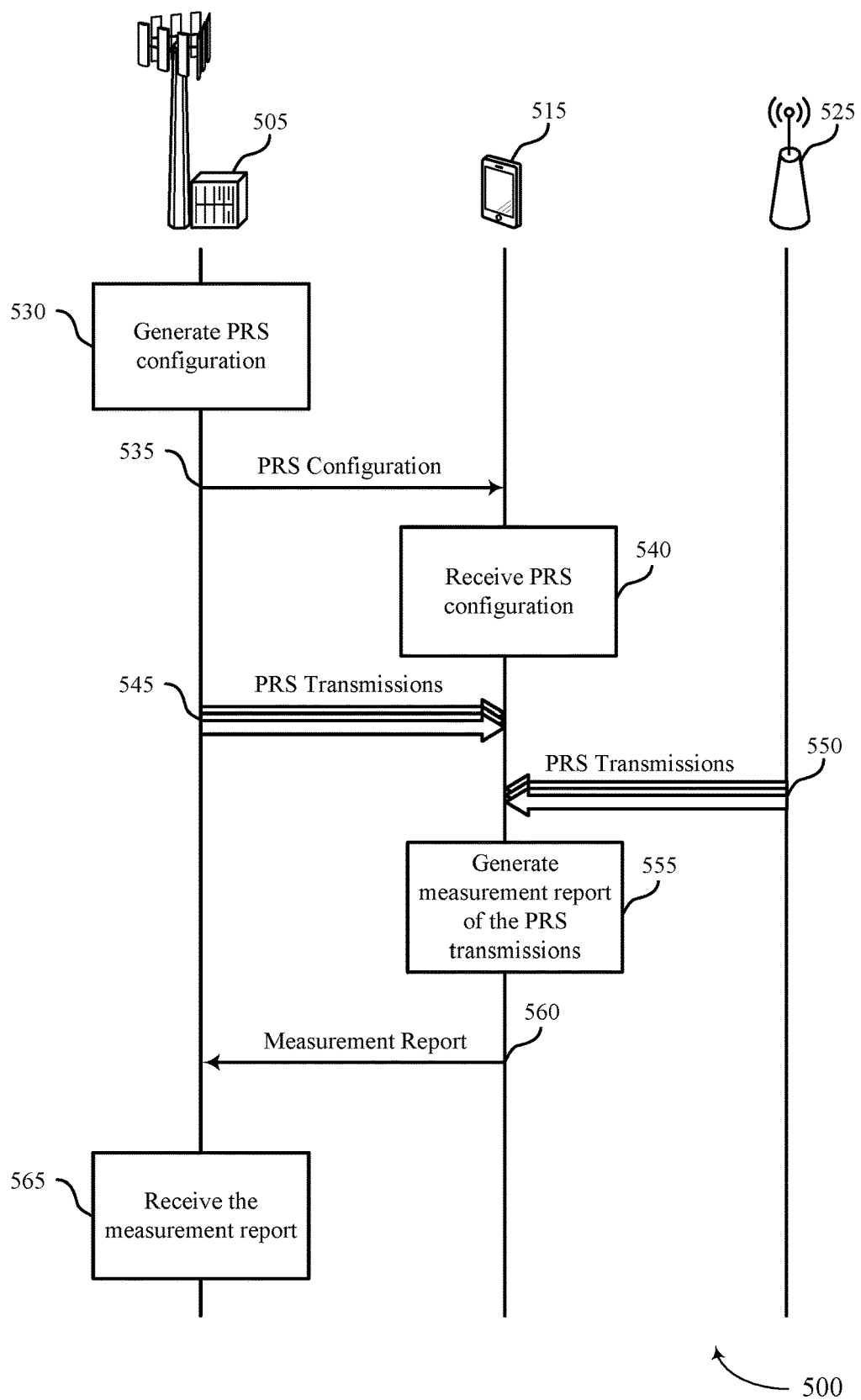
FIG. 5 illustrates an example of a process flow that supports positioning techniques in wireless communication systems in accordance with aspects of the present disclosure.

FIG. 5 illustrates an example of a process flow 500 that supports positioning techniques in wireless communication systems in accordance with various aspects of the present disclosure. In some examples, process flow 500 may implement aspects of system 100 and 200. Base station 505, UE 515, and network device 525 may be examples of the corresponding devices described with reference to FIGS. 1 and 2. In some cases, base station 505 or network device 525 may be a service cell. In another case, base station 505 may be a service cell and network device 525 may be a dedicated reference signal base station. Alternatively, base station 505 and network device 525 may be a dedicated reference signal base station. Base station 505 and network device 525 may be of different types (e.g., macro or small cell base stations). UE 515 described herein may be able to communicate with various types of base station 505 and network device 525 including macro eNBs, small cell eNBs, gNBs, relay base stations, and the like.

At block 530, base station 505 may generate a PRS configuration. The PRS configuration may include a set of hopping frequencies for one or more PRS transmissions from base station 505 to UE 515. In some cases, the PRS configuration may also include a cell identifier associated with base station 505. The cell identifier may be a unique number that identifies base station 505 or a sector of base station 505. The PRS configuration may, additionally or alternatively, include a PRS periodicity, a PRS duration, or a time offset. The PRS periodicity may indicate time repetitions of a PRS transmission. For example, for multiple subframes of a frame (e.g., subframes 0 to 9), base station 505 may perform a PRS transmission (i.e., transmit a PRS) by selecting subframes (e.g., subframe 1 and subframe 6) for transmission of PRS. In some cases, the PRS configuration may configure UE 515 to perform a measurement of one or more PRS.

At 535, base station 505 may transmit the PRS configuration to UE 515. Base station 505 may transmit the PRS configuration in an RRC message. In some examples, base station 505 may transmit the PRS configuration in a MIB or a SIB. Base station 505 may transmit the PRS configuration to UE 515 during a RRC configuration procedure. In some cases, the RRC configuration procedure may be per-UE and per-base station (e.g., eNB, gNB). In this case, each UE may receive a different list of neighboring base stations. In some examples, for each neighboring base station, the UE may receive separate PRS configurations including different or same set of hopping frequencies.

At block 540, UE 515 may receive a PRS configuration. In this case, UE 515 may receive the transmitted PRS configuration from base station 505. The received PRS configuration may include a set of hopping frequencies for one or more PRS transmissions, a cell identifier associated with base station 505, a PRS periodicity, a PRS duration, or a time offset, or any combination thereof.

At 545, base station 505 may transmit a plurality of PRS transmissions to UE 515. In some cases, the plurality of PRS transmissions may be transmitted over a shared radio frequency spectrum. Base station 505 may transmit the PRS transmissions according to the generated PRS configuration. In some cases, base station 505 may transmit all the PRS transmissions on non-anchor hopping frequencies, based on the PRS configuration. Alternatively, base station 505 may transmit all the PRS transmissions on anchor hopping frequencies, based on the PRS configuration. In some cases, base station 505 may transmit at least one of the PRS transmissions on a non-anchor hopping frequency, based on the PRS configuration.

Optionally, in some cases, at 550, network device 525 may also transmit a plurality of PRS transmissions to UE 515. In this case, UE 515 may receive all PRS transmissions, i.e., from base station 505 and network device 525 on an anchor hopping frequency or a non-anchor hopping frequency. In some cases, UE 515 may receive all PRS transmissions from base station 505 and network device 525 during a same subframe or a set of subframes associated with an anchor hopping frequency.

At block 555, UE 515 may generate a measurement report of the PRS transmissions. UE 515 may generate the measurement report based on a reporting configuration. The reporting configuration may be network operator-specific. At 560, UE 515 may transmit the measurement report to base station 505. In this case, base station 505 may be a serving cell of UE 515. At block 565, base station 505 may receive the measurement report. In some cases, base station 505 may use the measurement report to identify a geo-location of UE 515. For example, base station 505 may identify a OTDOA or a RSTD indicated by UE 515 in the measurement report. Using the reported OTDOA or RSTD, base station 505 may determine a position of UE 515 within a geographic sector (e.g., area, perimeter).

Figure 6:
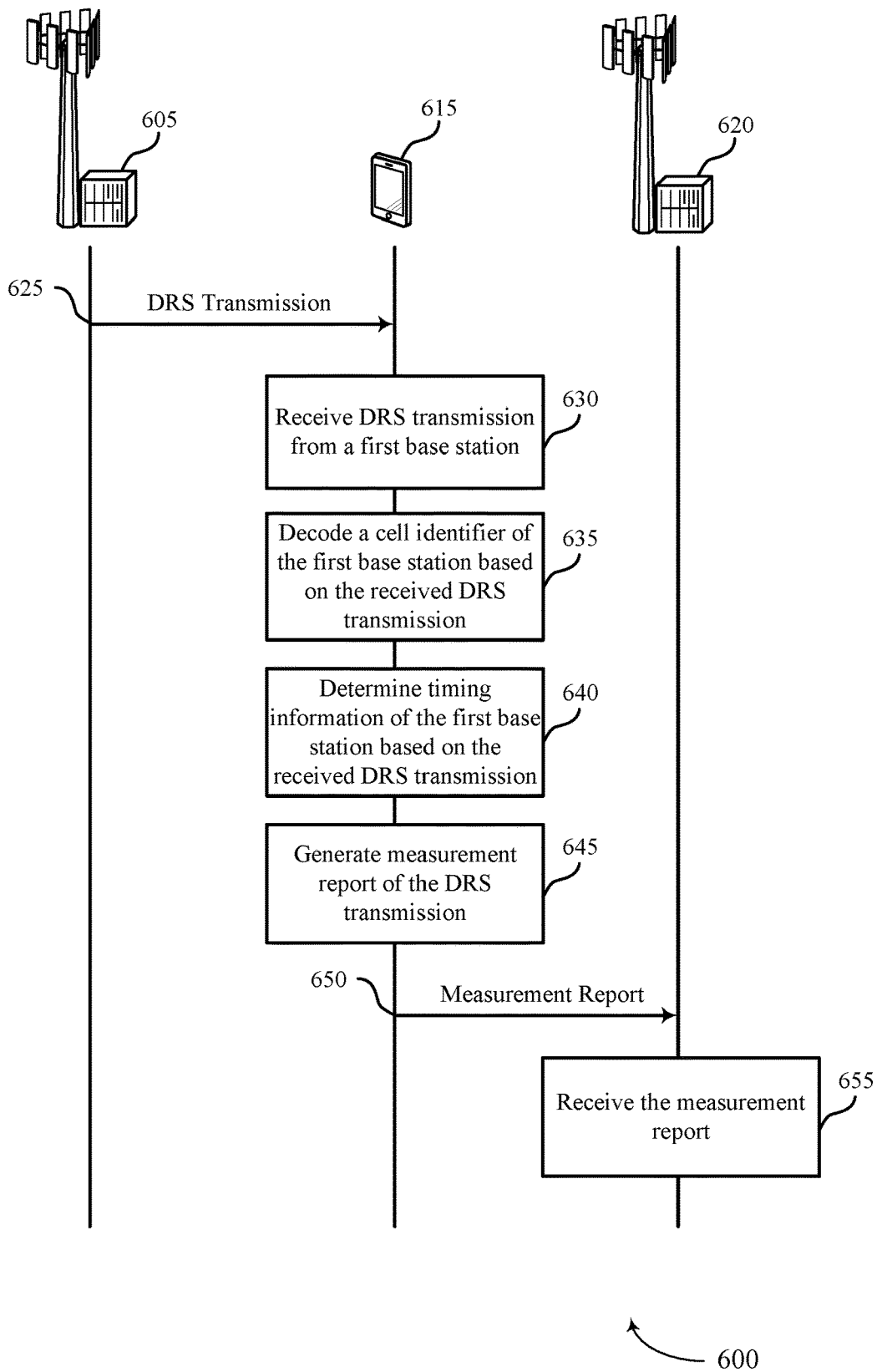
FIG. 6 illustrates an example of a process flow that supports positioning techniques in wireless communication systems in accordance with aspects of the present disclosure.

FIG. 6 illustrates an example of a process flow 600 that supports positioning techniques in wireless communication systems in accordance with various aspects of the present disclosure. In some examples, process flow 600 may implement aspects of system 100 and 200. Base station 605, UE 615, and base station 620 may be examples of the corresponding devices described with reference to FIGS. 1 and 2. In some cases, base station 605 or base station 620 may be a service cell. In another case, base station 605 may be a service cell and base station 620 may be a dedicated reference signal base station. Alternatively, base station 605 and base station 620 may be a dedicated reference signal base station. Base station 605 and base station 620 may be of different types (e.g., macro or small cell base stations). UE 615 described herein may be able to communicate with various types of base station 605 and base station 620 including macro eNBs, small cell eNBs, gNBs, relay base stations, and the like.

In the following description of the process flow 600, the operations between base station 605, base station 620, and UE 615 may be transmitted in a different order than the exemplary order shown, or the operations performed by base station 605, the base station 620, and UE 615 may be performed in different orders or at different times. Certain operations may also be left out of the process flow 600, or other operations may be added to the process flow 600. In some examples, process flow 600 may commence with base station 605 establishing a connection with UE 615. Base station 605 or base station 620, or both may provide radio resources to UE 615 for respective uplink communications. In an example, base station 605 or base station 620, or both may also provide radio resources to UE 615 for respective downlink communications. To improve positioning using coverage enhanced DRS, a serving cell may provide to a UE neighboring cell information associated with one or more neighboring cells. The neighboring cell information may include a cell identifier, a frequency hopping pattern, a channel list, or a PRS configuration, or any combination thereof. In some cases, the neighboring cell information may be communicated to a UE during a RRC connection and configuration procedure.

At 625, base station 605 may transmit a DRS transmission, to UE 615. The DRS transmission may, in some cases, include a number of time repetitions of a DRS. That is, base station 605 may perform multiple DRS transmissions during a transmission interval. In an example, base station 605 may transmit a DRS transmission every n number of subframes or OFDM symbols of a slot during a transmission interval, where n is a positive value. For example, for a single slot (including OFDM symbols 0 to 7) of a subframe, base station 605 may perform a DRS transmission at OFDM symbol 0 and OFDM symbol 4. Alternatively, for multiple subframes of a frame (e.g., subframes 0 to 9), base station 605 may perform a DRS transmission at subframe 1 and subframe 6. Additionally, base station 605 may transmit a DRS transmission every m sub-carriers, where m is a positive value. In some cases, base station 605 may transmit a DRS transmission on an anchor channel, e.g., an anchor frequency. As such, use of coverage enhanced DRS may support and improve positioning techniques in a wireless communication system. That is, by having base station 605 perform multiple DRS transmissions during a transmission interval, positioning techniques in a wireless communication system may be enhanced.

In some cases, a DRS transmission may include a physical-layer reference signal. For example, a physical-layer reference signal may include a PRS, a PSS, a SSS, or a CRS, or any combination thereof. Additionally, physical-layer reference signals may include a channel state information reference signal (CSI-RS), a channel-state information-interference measurement (CSI-IM) signal, or any combination thereof.

At block 630, UE 615 may receive a DRS transmission from a first base station. In this cases, UE 615 may receive the transmitted DRS transmission from base station 605. The DRS transmission may include one or more PRSs. In some examples, as highlighted above, a DRS transmission may include a plurality of time repetitions of a DRS transmission. For example, for multiple subframes of a frame (e.g., subframes 0 to 9), UE 615 may receive a DRS transmission at subframe 1 and subframe 6.

At block 635, UE 615 may decode a cell identifier of the first base station based on the received DRS transmission. In this case, UE 615 may decode a cell identifier of base station 605. The cell identifier may be a unique number that identifies base station 605 or a sector (e.g., coverage area) of base station 605. In some cases, the cell identifier may be a physical layer cell identifier. Base station 605 may perform the DRS transmission on an assigned antenna port (e.g., antenna port 6). The assigned antenna port may be defined such that a channel over which an OFDM symbol on the antenna port is communicated to UE 615 may be inferred from the channel over which another OFDM symbol on the same assigned antenna port is communicated. As such, UE 615 may demodulate and decode the DRS transmission which is transmitted over the assigned antenna port to decode and identify the cell identifier of base station 605.

At block 640, UE 615 may determine timing information of the first base station based on the received DRS transmission. In this case, UE 615 may determine timing information of base station 605. In some cases, UE 615 may determine timing information of base station 605 by measuring an OTDOA between multiple DRS transmissions. UE 615 determine timing information of base station 605 by measuring a RSTD. The RSTD may be a timing difference between a subframe received from base station 605 and a subframe received from base station 620. Base station 605 may be a dedicated reference signal base station, and base station 620 may be a serving cell. In some cases, UE 615 may measure a RSTD without a serving cell configuration. For example, UE 615 may measure a RSTD between two subframes received from base station 605. As such, the timing information of the first base station may be an OTDOA or a RSTD.

At block 645, UE 615 may generate a measurement report of the DRS transmission. The measurement report may include the cell identifier and the timing information of the first base station (i.e., base station 605). In some cases, UE 615 may generate the measurement report based on a reporting configuration. The reporting configuration may be network operator-specific. At 650, UE 615 may transmit the measurement report to base station 620. In this case, base station 620 may be a serving cell of UE 615. At block 655, base station 620 may receive the measurement report. In some cases, base station 620 may use the measurement report to identify a geo-location of UE 615. For example, base station 620 may identify a reported OTDOA or a reported RSTD indicated by UE 615 in the measurement report. Using the reported OTDOA or RSTD, base station 620 may determine a geo-location of UE 615 within a geographic coverage area.

Figure 7:
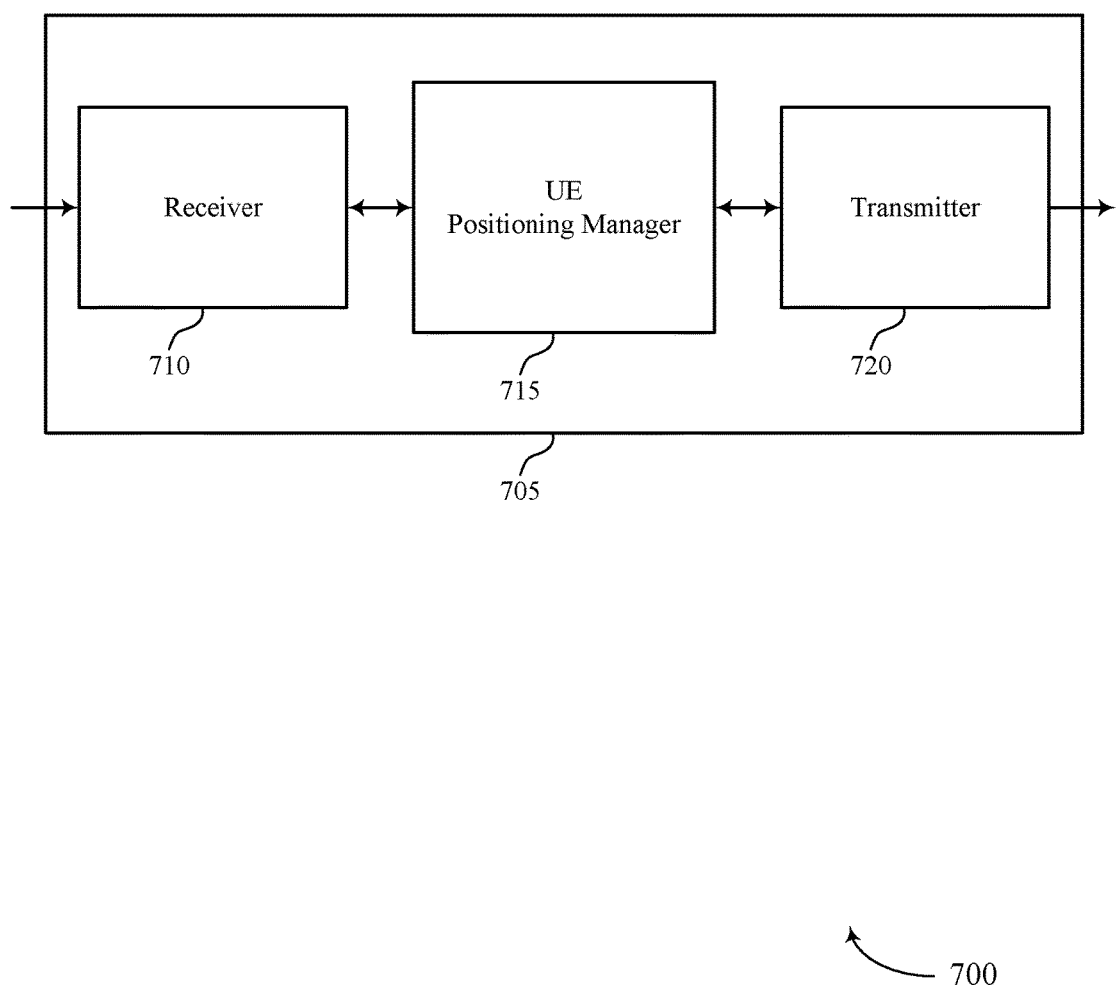
FIGS. 7 through 9 show block diagrams of a device that supports positioning techniques in wireless communication systems in accordance with aspects of the present disclosure.

FIG. 7 shows a block diagram 700 of a wireless device 705 that supports positioning techniques in wireless communication systems in accordance with aspects of the present disclosure. Wireless device 705 may be an example of aspects of a UE 115 as described herein. Wireless device 705 may include receiver 710, UE positioning manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to positioning techniques in wireless communication systems, etc.). Information may be passed on to other components of the device. The receiver 710 may be an example of aspects of the transceiver 1035 described with reference to FIG. 10. The receiver 710 may utilize a single antenna or a set of antennas.

UE positioning manager 715 may be an example of aspects of the UE positioning manager 1015 described with reference to FIG. 10. UE positioning manager 715 and/or at least some of its various sub-components may be implemented in hardware, software executed by a processor, firmware, or any combination thereof. If implemented in software executed by a processor, the functions of the UE positioning manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE positioning manager 715 and/or at least some of its various sub-components may be physically located at various positions, including being distributed such that portions of functions are implemented at different physical locations by one or more physical devices. In some examples, UE positioning manager 715 and/or at least some of its various sub-components may be a separate and distinct component in accordance with various aspects of the present disclosure. In other examples, UE positioning manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE positioning manager 715 may receive a PRS configuration, receive a set of PRS transmissions over a shared radio frequency spectrum from a set of base stations, where the PRS transmissions are received according to the PRS configuration, and transmit a measurement report of the PRS transmissions. The UE positioning manager 715 may also receive a DRS transmission from a first base station, the DRS transmission including a set of time repetitions of a DRS, decode a cell identifier of the first base station based on the DRS transmission, determine timing information of the first base station based on the DRS transmission, and transmit a measurement report of the DRS transmission to a second base station, the measurement report including the cell identifier and the timing information of the first base station.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
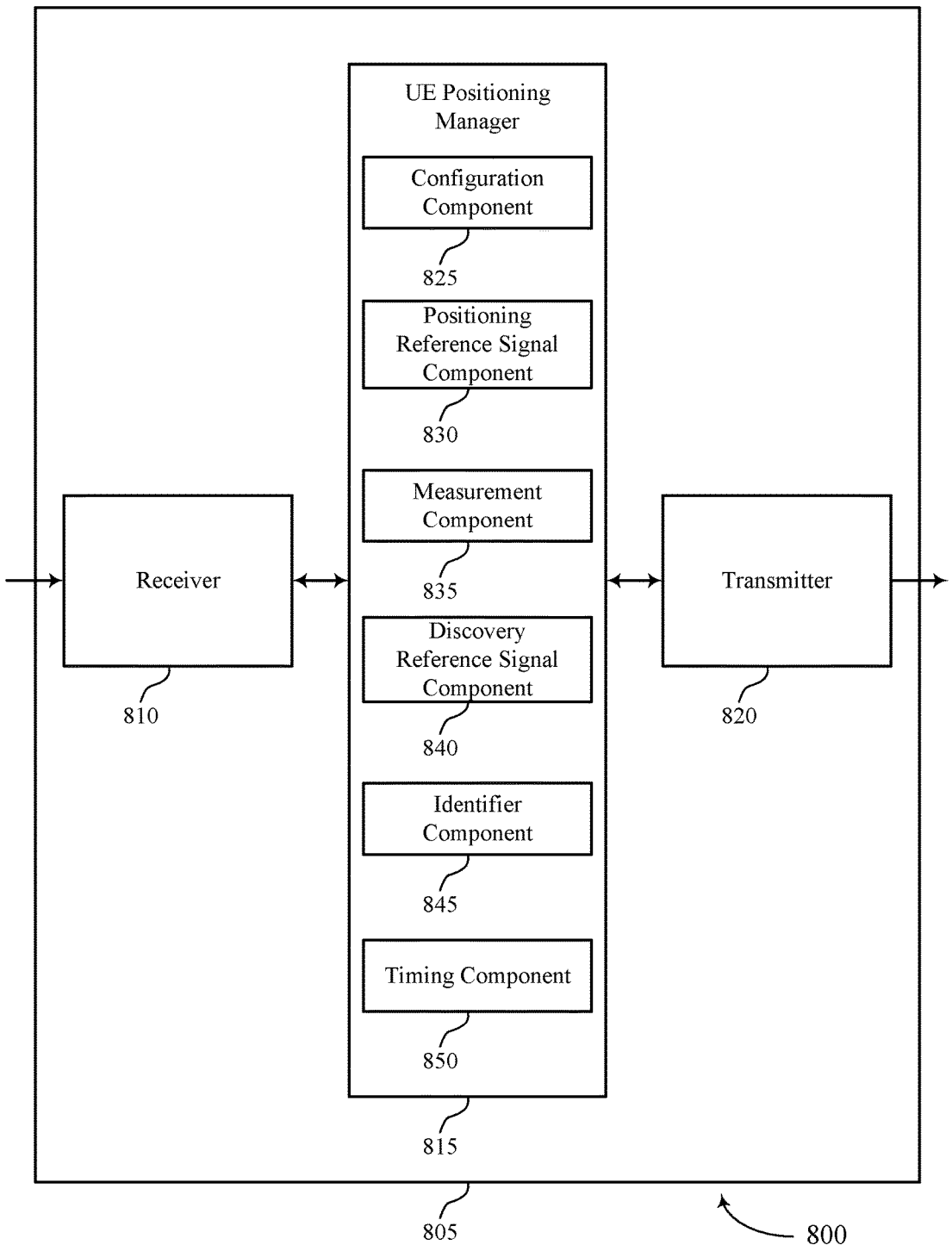

FIG. 8 shows a block diagram 800 of a wireless device 805 that supports positioning techniques in wireless communication systems in accordance with aspects of the present disclosure. Wireless device 805 may be an example of aspects of a wireless device 705 or a UE 115 as described with reference to FIG. 7. Wireless device 805 may include receiver 810, UE positioning manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to positioning techniques in wireless communication systems, etc.). Information may be passed on to other components of the device. The receiver 810 may be an example of aspects of the transceiver 1035 described with reference to FIG. 10. The receiver 810 may utilize a single antenna or a set of antennas.

UE positioning manager 815 may be an example of aspects of the UE positioning manager 1015 described with reference to FIG. 10. UE positioning manager 815 may also include configuration component 825, positioning reference signal component 830, measurement component 835, discovery reference signal component 840, identifier component 845, and timing component 850.

Configuration component 825 may receive a PRS configuration. In some cases, configuration component 825 may receive a set of hopping frequencies for the PRS transmissions. Configuration component 825 may receive a set of cell identifiers associated with a set of base stations, and determine a pseudo random hopping pattern of each base station of the set of base stations based on a received cell identifier of each of the set of base stations. The set of PRS transmissions may be received in accordance with the determined pseudo random hopping pattern of each base station. In some cases, configuration component 825 may receive at least one of: a PRS periodicity, a PRS duration, or a time offset associated with one or more of the set of base stations. In some cases, the PRS periodicity is greater than a hopping frame periodicity of the set of base stations. In some cases, at least one of the set of base stations includes a dedicated reference signal base station.

Positioning reference signal component 830 may receive a set of PRS transmissions over a shared radio frequency spectrum from the set of base stations. The PRS transmissions may be received according to the PRS configuration. Positioning reference signal component 830 may receive all PRS transmissions from all base stations of the set of base stations on non-anchor hopping frequencies. Positioning reference signal component 830 may receive all PRS transmissions from all base stations of the set of base stations on an anchor hopping frequency. Positioning reference signal component 830 may receive at least one of the PRS transmissions immediately before or after a serving cell transmission on a non-anchor hopping frequency. Positioning reference signal component 830 may receive the set of PRS transmissions from multiple ones of the set of base stations during a same set of one or more subframes of the anchor hopping frequency. In some cases, positioning reference signal component 830 may receive at least one PRS transmission during a PRS occasion including a set of repetitions of PRS subframes.

Measurement component 835 may transmit a measurement report of the PRS transmissions and transmit a measurement report of the DRS transmission to a second base station, the measurement report including the cell identifier and the timing information of the first base station. Discovery reference signal component 840 may receive a DRS transmission from a first base station. The DRS transmission including a set of time repetitions of a DRS. Identifier component 845 may decode a cell identifier of the first base station based on the DRS transmission. Timing component 850 may determine timing information of the first base station based on the DRS transmission.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
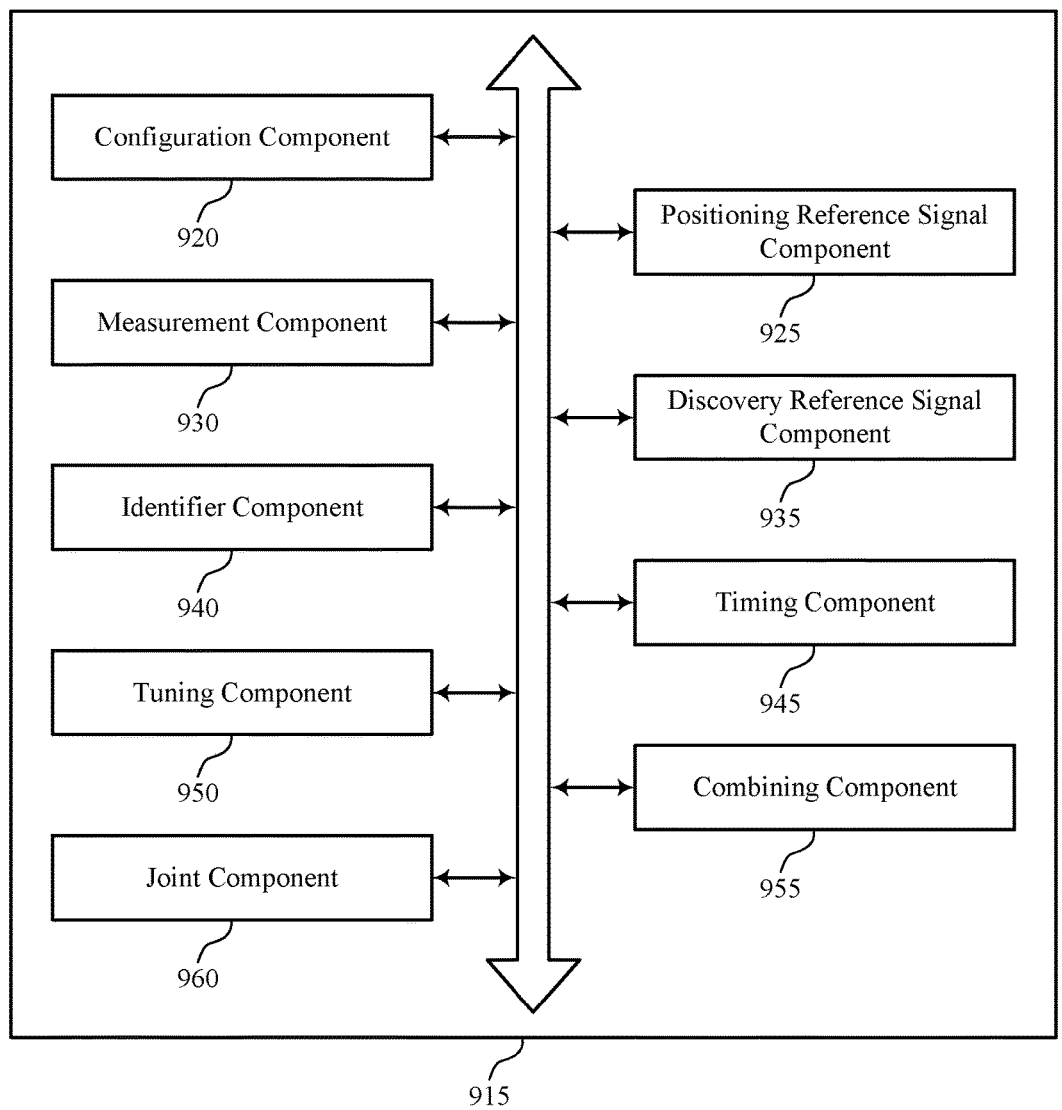

FIG. 9 shows a block diagram 900 of a UE positioning manager 915 that supports positioning techniques in wireless communication systems in accordance with aspects of the present disclosure. The UE positioning manager 915 may be an example of aspects of a UE positioning manager 715, a UE positioning manager 815, or a UE positioning manager 1015 described with reference to FIGS. 7, 8, and 10. The UE positioning manager 915 may include configuration component 920, positioning reference signal component 925, measurement component 930, discovery reference signal component 935, identifier component 940, timing component 945, tuning component 950, combining component 955, and joint component 960. Each of these modules may communicate, directly or indirectly, with one another (e.g., via one or more buses).

Configuration component 920 may receive a PRS configuration. In some case, configuration component 920 may receive a set of hopping frequencies for the PRS transmissions. The configuration component 920 may receive a set of cell identifiers associated with a set of base stations, and determine a pseudo random hopping pattern of each base station of the set of base stations based on a received cell identifier of each of the set of base stations. The set of PRS transmissions may be received in accordance with the determined pseudo random hopping pattern of each base station. In some case, configuration component 920 may receive at least one of: a PRS periodicity, a PRS duration, or a time offset associated with one or more of the set of base stations. In some cases, the PRS periodicity is greater than a hopping frame periodicity of the set of base stations. In some cases, at least one of the set of base stations includes a dedicated reference signal base station.

Positioning reference signal component 925 may receive a set of PRS transmissions over a shared radio frequency spectrum from the set of base stations. The PRS transmissions may be received according to the PRS configuration. Positioning reference signal component 925 may receive all PRS transmissions from all base stations of the set of base stations on non-anchor hopping frequencies. In some cases, positioning reference signal component 925 may receive all PRS transmissions from all base stations of the set of base stations on an anchor hopping frequency, or receive at least one of the PRS transmissions immediately before or after a serving cell transmission on a non-anchor hopping frequency, or both. Positioning reference signal component 925 may receive the set of PRS transmissions from multiple ones of the set of base stations during a same set of one or more subframes of the anchor hopping frequency. The positioning reference signal component 925 may receive at least one PRS transmission during a PRS occasion including a set of repetitions of PRS subframes.

Measurement component 930 may transmit a measurement report of the PRS transmissions and transmit a measurement report of the DRS transmission to a second base station. The measurement report may include the cell identifier and the timing information of the first base station. Discovery reference signal component 935 may receive a DRS transmission from a first base station. The DRS transmission may include a set of time repetitions of a DRS.

Identifier component 940 may decode a cell identifier of the first base station based on the DRS transmission. Timing component 945 may determine timing information of the first base station based on the DRS transmission. Tuning component 950 may tune away from a serving cell during a measurement gap associated with measuring at least one of the PRS transmissions. Combining component 955 may perform combining of the set of repetitions of PRS subframes within the PRS occasion. Joint component 960 may detect a transmission and estimating a delay jointly based on the combining.

Figure 10:
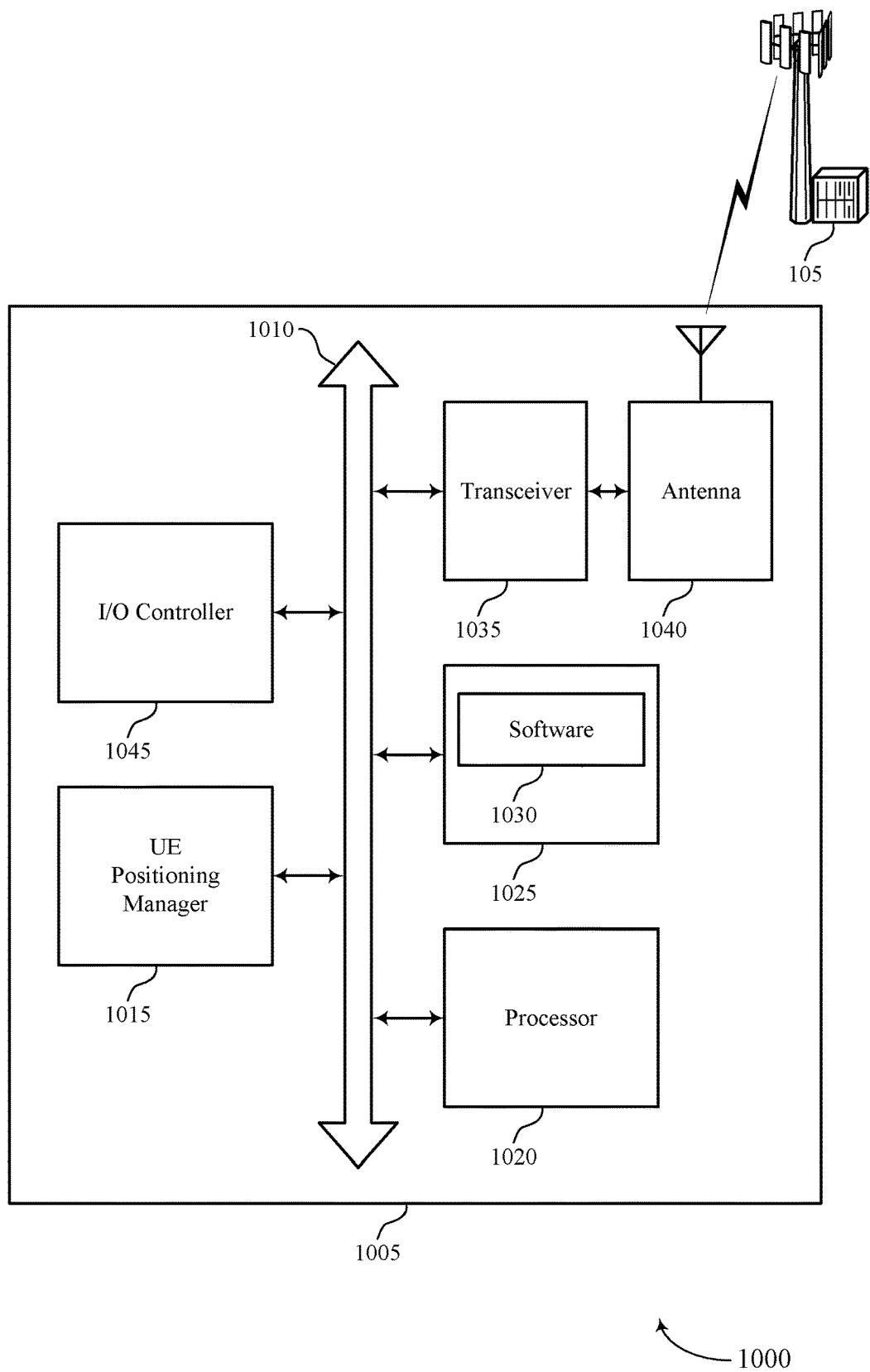
FIG. 10 illustrates a block diagram of a system including a UE that supports positioning techniques in wireless communication systems in accordance with aspects of the present disclosure.

FIG. 10 shows a diagram of a system 1000 including a device 1005 that supports positioning techniques in wireless communication systems in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE positioning manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting positioning techniques in wireless communication systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices. Software 1030 may include code to implement aspects of the present disclosure, including code to support positioning techniques in wireless communication systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
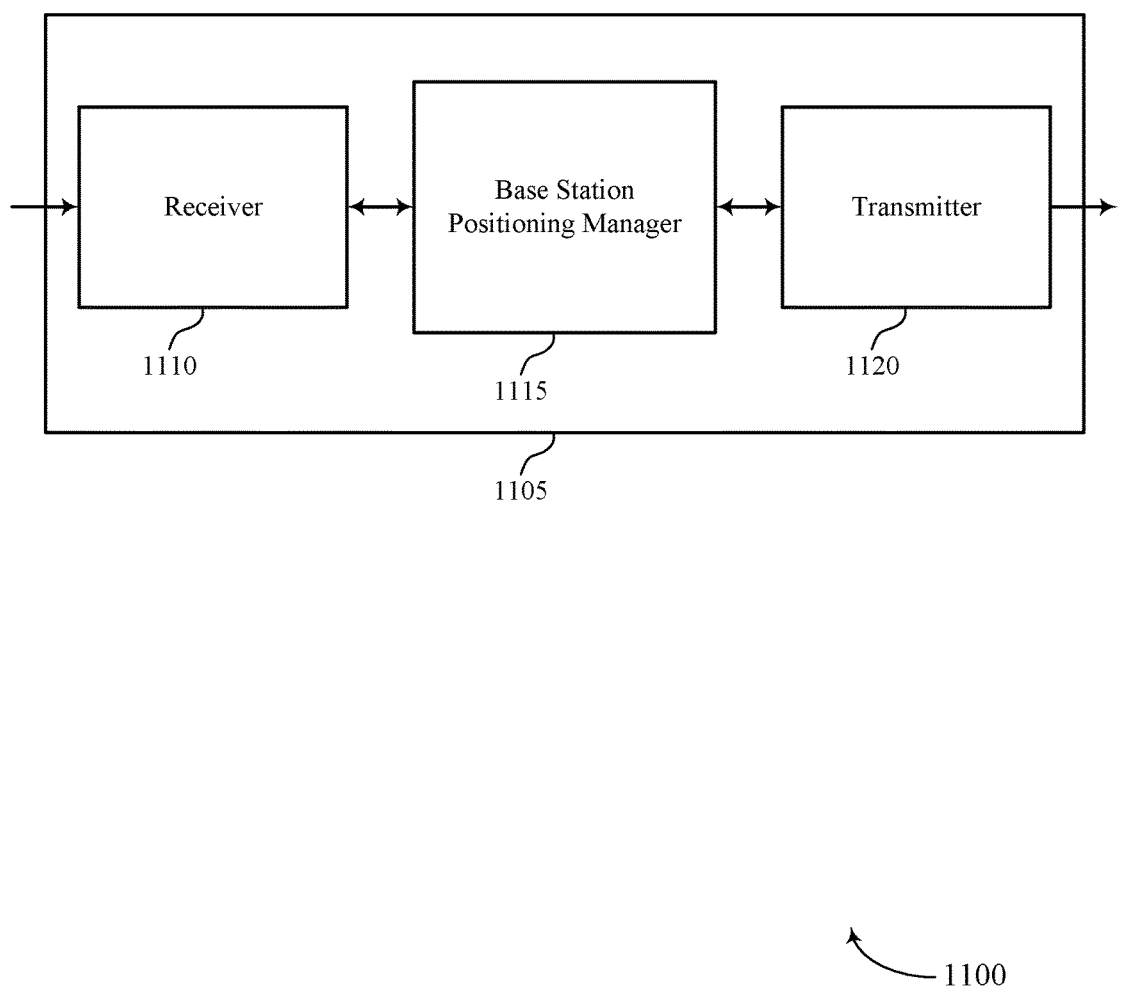
FIGS. 11 through 13 show block diagrams of a device that supports positioning techniques in wireless communication systems in accordance with aspects of the present disclosure.

FIG. 11 shows a block diagram 1100 of a wireless device 1105 that supports positioning techniques in wireless communication systems in accordance with aspects of the present disclosure. Wireless device 1105 may be an example of aspects of a base station 105 as described herein. Wireless device 1105 may include receiver 1110, base station positioning manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to positioning techniques in wireless communication systems, etc.). Information may be passed on to other components of the device. The receiver 1110 may be an example of aspects of the transceiver 1435 described with reference to FIG. 14. The receiver 1110 may utilize a single antenna or a set of antennas.

Base station positioning manager 1115 may be an example of aspects of the base station positioning manager 1415 described with reference to FIG. 14. Base station positioning manager 1115 and/or at least some of its various sub-components may be implemented in hardware, software executed by a processor, firmware, or any combination thereof. If implemented in software executed by a processor, the functions of the base station positioning manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station positioning manager 1115 and/or at least some of its various sub-components may be physically located at various positions, including being distributed such that portions of functions are implemented at different physical locations by one or more physical devices. In some examples, base station positioning manager 1115 and/or at least some of its various sub-components may be a separate and distinct component in accordance with various aspects of the present disclosure. In other examples, base station positioning manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station positioning manager 1115 may transmit a PRS configuration to a UE, transmit a set of PRS transmissions over a shared radio frequency spectrum, where the PRS transmissions are transmitted according to the PRS configuration, and receive a measurement report of the PRS transmissions from the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
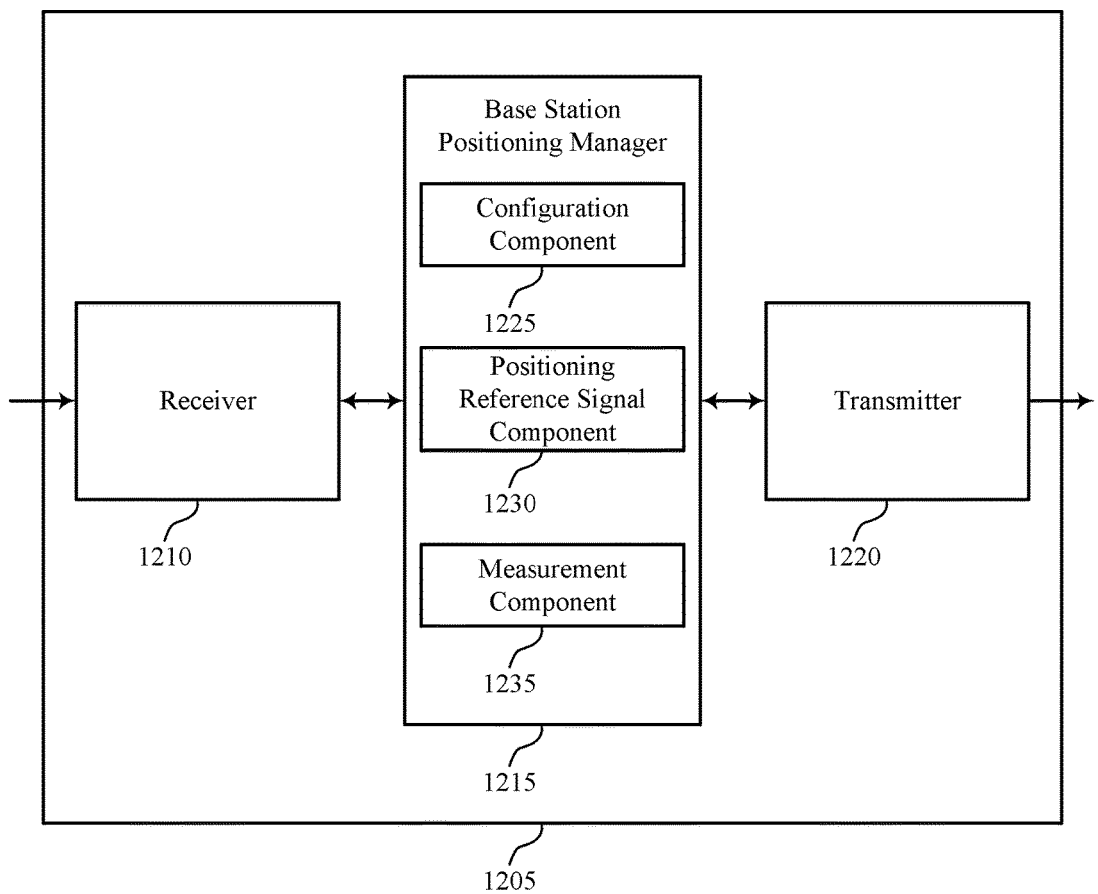

FIG. 12 shows a block diagram 1200 of a wireless device 1205 that supports positioning techniques in wireless communication systems in accordance with aspects of the present disclosure. Wireless device 1205 may be an example of aspects of a wireless device 1105 or a base station 105 as described with reference to FIG. 11. Wireless device 1205 may include receiver 1210, base station positioning manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to positioning techniques in wireless communication systems, etc.). Information may be passed on to other components of the device. The receiver 1210 may be an example of aspects of the transceiver 1435 described with reference to FIG. 14. The receiver 1210 may utilize a single antenna or a set of antennas.

Base station positioning manager 1215 may be an example of aspects of the base station positioning manager 1415 described with reference to FIG. 14. Base station positioning manager 1215 may also include configuration component 1225, positioning reference signal component 1230, and measurement component 1235.

Configuration component 1225 may transmit a PRS configuration to a UE. In some cases, the base station may be a serving cell. In some cases, the base station may be a dedicated reference signal base station. Positioning reference signal component 1230 may transmit a set of PRS transmissions over a shared radio frequency spectrum. The PRS transmissions may be transmitted according to the PRS configuration. In some cases, positioning reference signal component 1230 may transmit a set of hopping frequencies for the PRS transmissions, transmit at least one of: a PRS periodicity, a PRS duration, or a time offset, transmit all PRS transmissions on non-anchor hopping frequencies, transmit all PRS transmissions on an anchor hopping frequency, and transmit at least one of the PRS transmissions on a non-anchor hopping frequency. Measurement component 1235 may receive a measurement report of the PRS transmissions from the UE.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
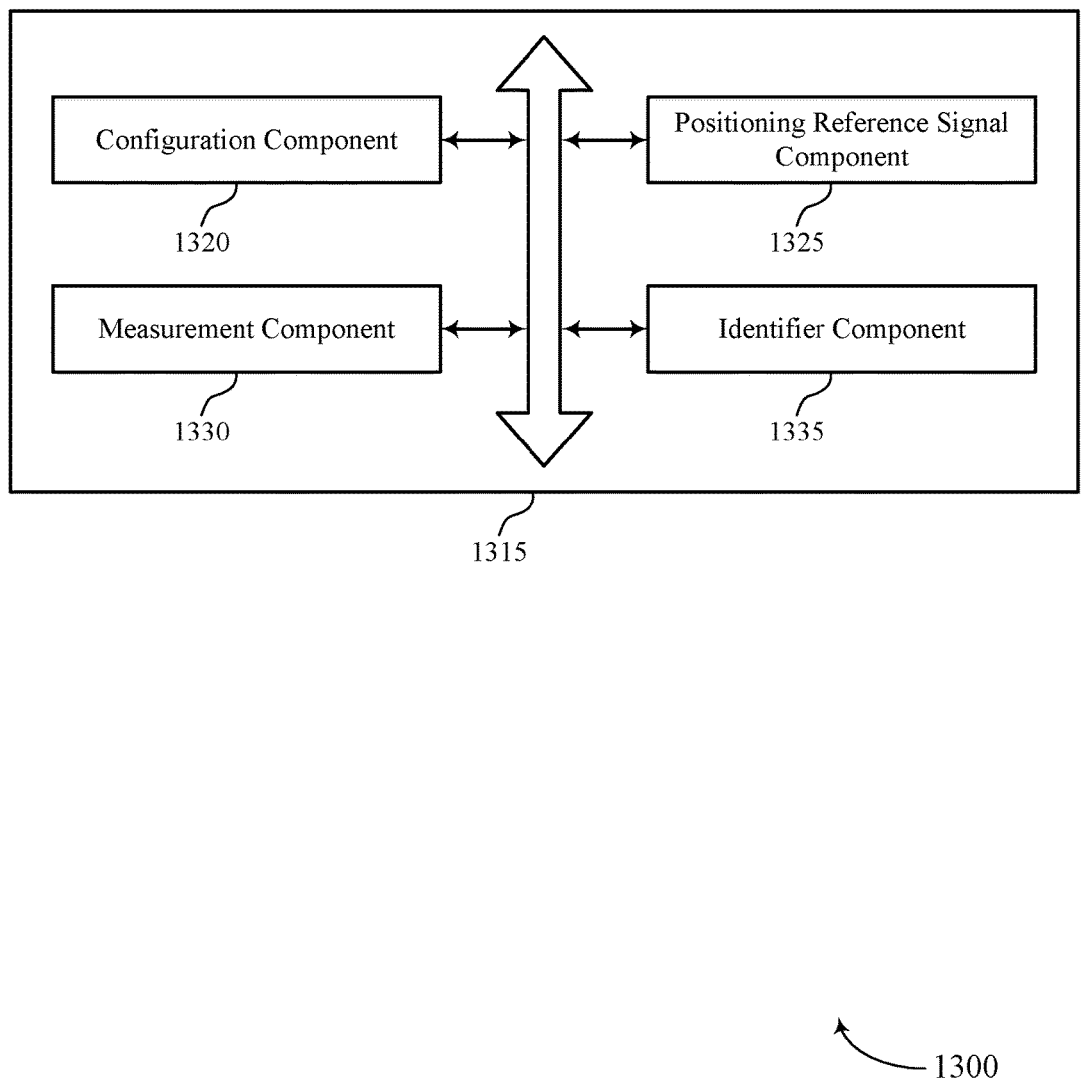

FIG. 13 shows a block diagram 1300 of a base station positioning manager 1315 that supports positioning techniques in wireless communication systems in accordance with aspects of the present disclosure. The base station positioning manager 1315 may be an example of aspects of a base station positioning manager 1415 described with reference to FIGS. 11, 12, and 14. The base station positioning manager 1315 may include configuration component 1320, positioning reference signal component 1325, measurement component 1330, and identifier component 1335. Each of these modules may communicate, directly or indirectly, with one another (e.g., via one or more buses).

Configuration component 1320 may transmit a PRS configuration to a UE. In some cases, the base station may be a serving cell. Additionally or alternatively, the base station may be a dedicated reference signal base station. Positioning reference signal component 1325 may transmit a set of PRS transmissions over a shared radio frequency spectrum. The PRS transmissions may be transmitted according to the PRS configuration. In some cases, positioning reference signal component 1325 may transmit a set of hopping frequencies for the PRS transmissions. Positioning reference signal component 1325 may in some cases, transmit at least one of: a PRS periodicity, a PRS duration, or a time offset.

The positioning reference signal component 1325 may transmit all PRS transmissions on non-anchor hopping frequencies. In some cases, positioning reference signal component 1325 may transmit all PRS transmissions on an anchor hopping frequency. In some cases, positioning reference signal component 1325 may transmit at least one of the PRS transmissions on a non-anchor hopping frequency. Measurement component 1330 may receive a measurement report of the PRS transmissions from the UE. Identifier component 1335 may transmit a cell identifier associated with the base station.

Figure 14:
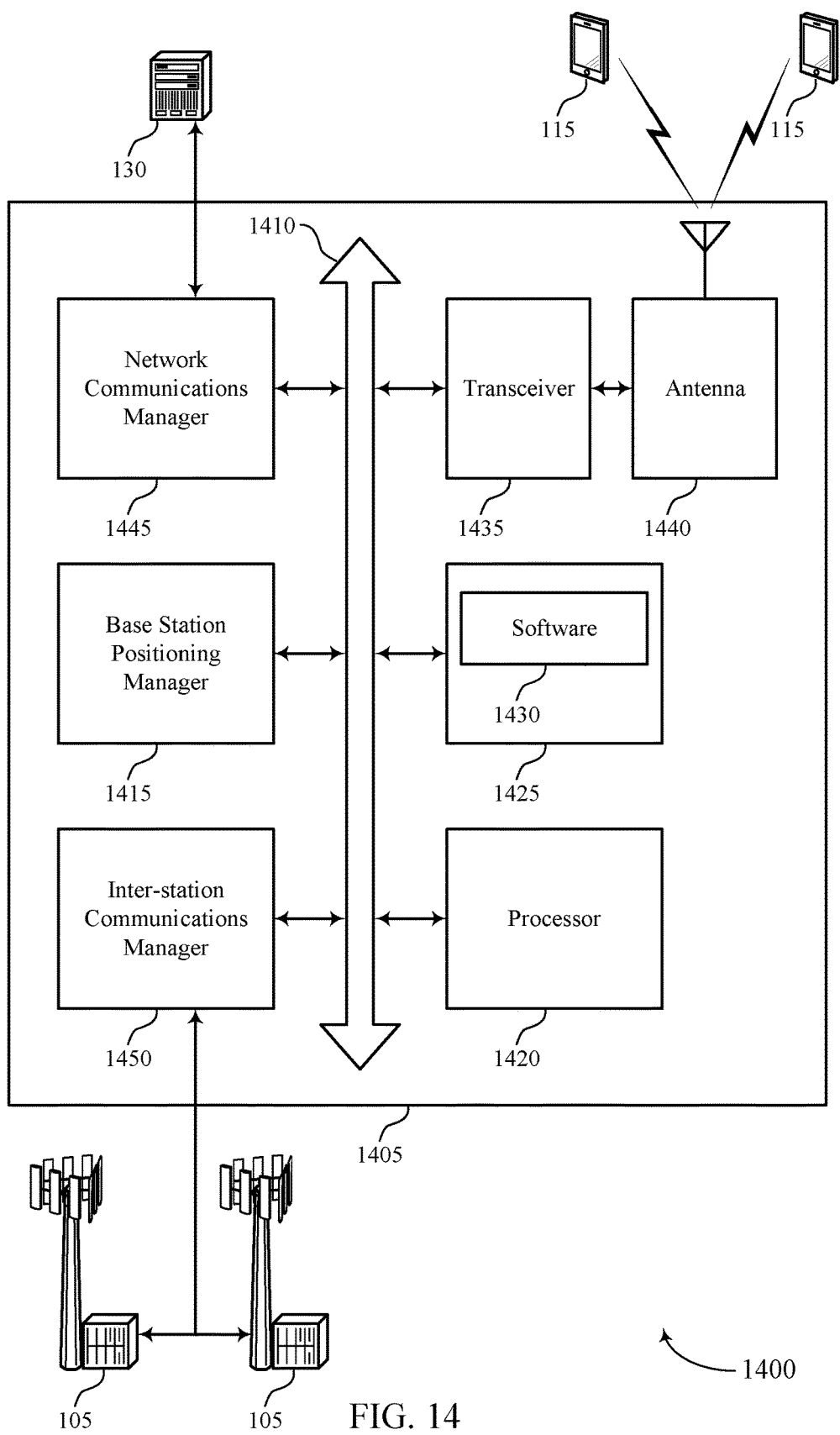
FIG. 14 illustrates a block diagram of a system including a base station that supports positioning techniques in wireless communication systems in accordance with aspects of the present disclosure.

FIG. 14 shows a diagram of a system 1400 including a device 1405 that supports positioning techniques in wireless communication systems in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station positioning manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting positioning techniques in wireless communication systems).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices. Software 1430 may include code to implement aspects of the present disclosure, including code to support positioning techniques in wireless communication systems. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions. Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
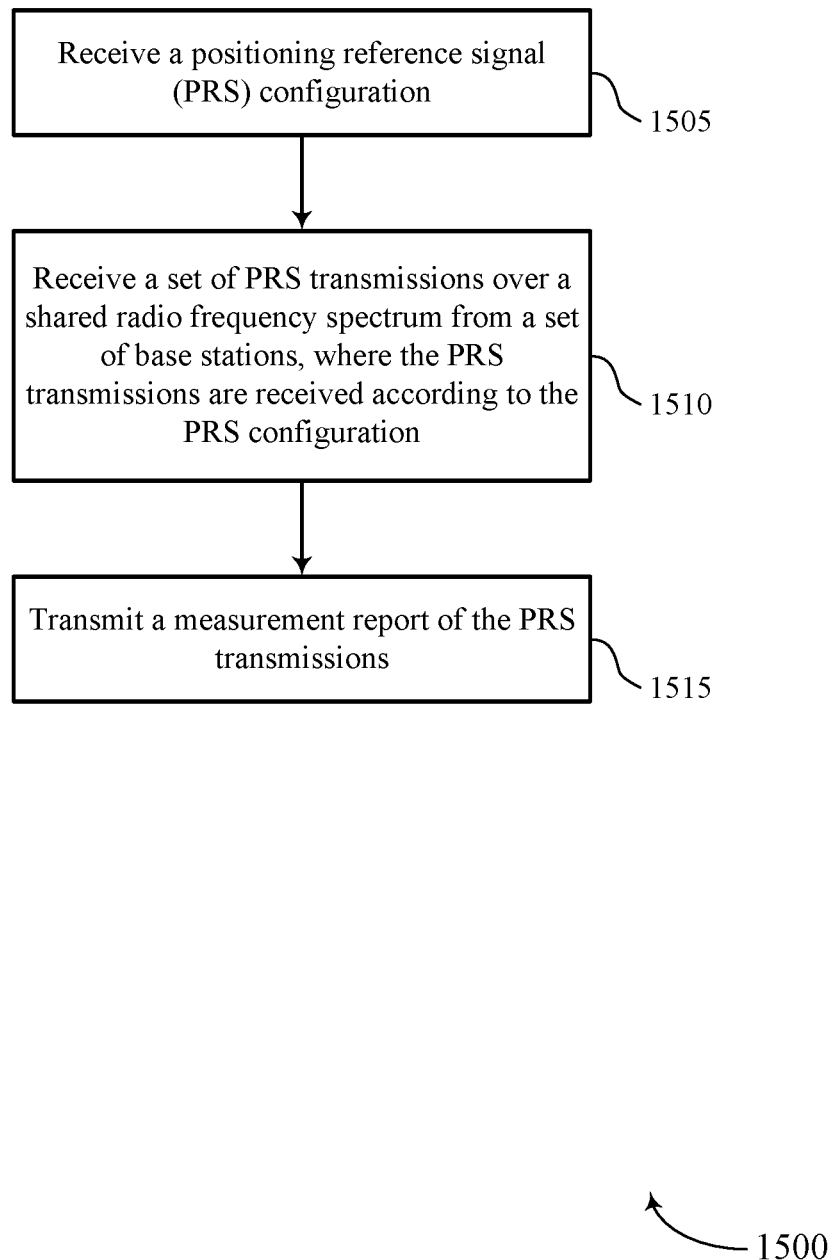
FIGS. 15 through 17 illustrate methods for positioning techniques in wireless communication systems in accordance with aspects of the present disclosure.

FIG. 15 shows a flowchart illustrating a method 1500 for positioning techniques in wireless communication systems in accordance with aspects of the present disclosure. The operations of method 1500 may be implemented by a UE 115 or its components as described herein. For example, the operations of method 1500 may be performed by a UE positioning manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a PRS configuration. The operations of block 1505 may be performed according to the methods described herein. In certain examples, aspects of the operations of block 1505 may be performed by a configuration component as described with reference to FIGS. 7 through 10, which may operate in cooperation with a receiver 710 or 810 as described with reference to FIG. 7 or 8, or antenna(s) 1040 and transceiver(s) 1035 as described with reference to FIG. 10.

At block 1510 the UE 115 may receive a plurality of PRS transmissions over a shared radio frequency spectrum from a plurality of base stations, where the PRS transmissions are received according to the PRS configuration. The operations of block 1510 may be performed according to the methods described herein. In certain examples, aspects of the operations of block 1510 may be performed by a positioning reference signal component as described with reference to FIGS. 7 through 10, which may operate in cooperation with a receiver 710 or 810 as described with reference to FIG. 7 or 8, or antenna(s) 1040 and transceiver(s) 1035 as described with reference to FIG. 10.

At block 1515 the UE 115 may transmit a measurement report of the PRS transmissions. The operations of block 1515 may be performed according to the methods described herein. In certain examples, aspects of the operations of block 1515 may be performed by a measurement component as described with reference to FIGS. 7 through 10, which may operate in cooperation with a transmitter 720 or 820 as described with reference to FIG. 7 or 8, or antenna(s) 1040 and transceiver(s) 1035 as described with reference to FIG. 10.

Figure 16:
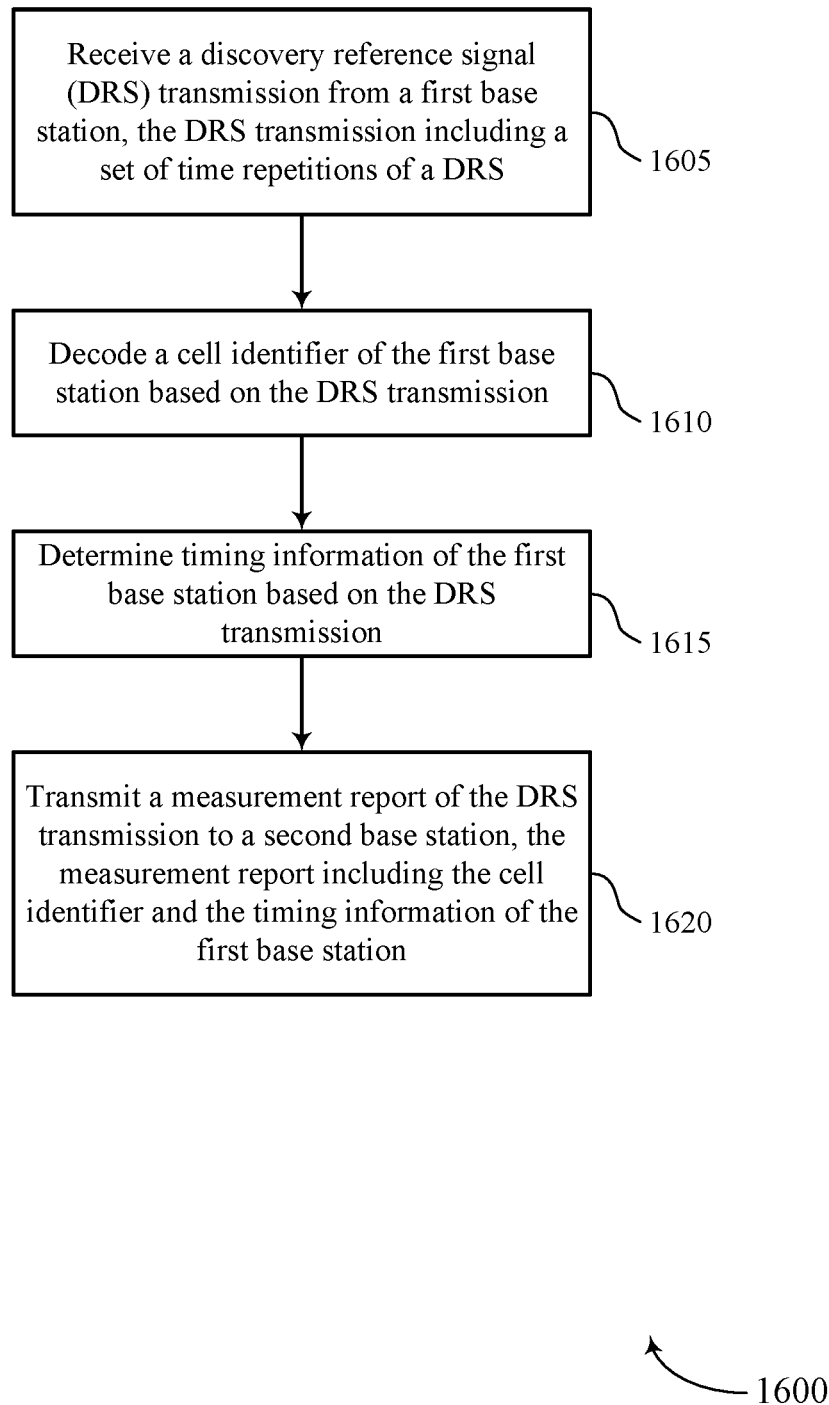

FIG. 16 shows a flowchart illustrating a method 1600 for positioning techniques in wireless communication systems in accordance with aspects of the present disclosure. The operations of method 1600 may be implemented by a UE 115 or its components as described herein. For example, the operations of method 1600 may be performed by a UE positioning manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a DRS transmission from a first base station, the DRS transmission may include a plurality of time repetitions of a DRS. The operations of block 1605 may be performed according to the methods described herein. In certain examples, aspects of the operations of block 1605 may be performed by a discovery reference signal component as described with reference to FIGS. 7 through 10, which may operate in cooperation with a receiver 710 or 810 as described with reference to FIG. 7 or 8, or antenna(s) 1040 and transceiver(s) 1035 as described with reference to FIG. 10.

At block 1610 the UE 115 may decode a cell identifier of the first base station based on the DRS transmission. The operations of block 1610 may be performed according to the methods described herein. In certain examples, aspects of the operations of block 1610 may be performed by a identifier component as described with reference to FIGS. 7 through 10.

At block 1615 the UE 115 may determine timing information of the first base station based on the DRS transmission. The operations of block 1615 may be performed according to the methods described herein. In certain examples, aspects of the operations of block 1615 may be performed by a timing component as described with reference to FIGS. 7 through 10.

At block 1620 the UE 115 may transmit a measurement report of the DRS transmission to a second base station, the measurement report may include the cell identifier and the timing information of the first base station. The operations of block 1620 may be performed according to the methods described herein. In certain examples, aspects of the operations of block 1620 may be performed by a measurement component as described with reference to FIGS. 7 through 10, which may operate in cooperation with a transmitter 720 or 820 as described with reference to FIG. 7 or 8, or antenna(s) 1040 and transceiver(s) 1035 as described with reference to FIG. 10.

Figure 17:
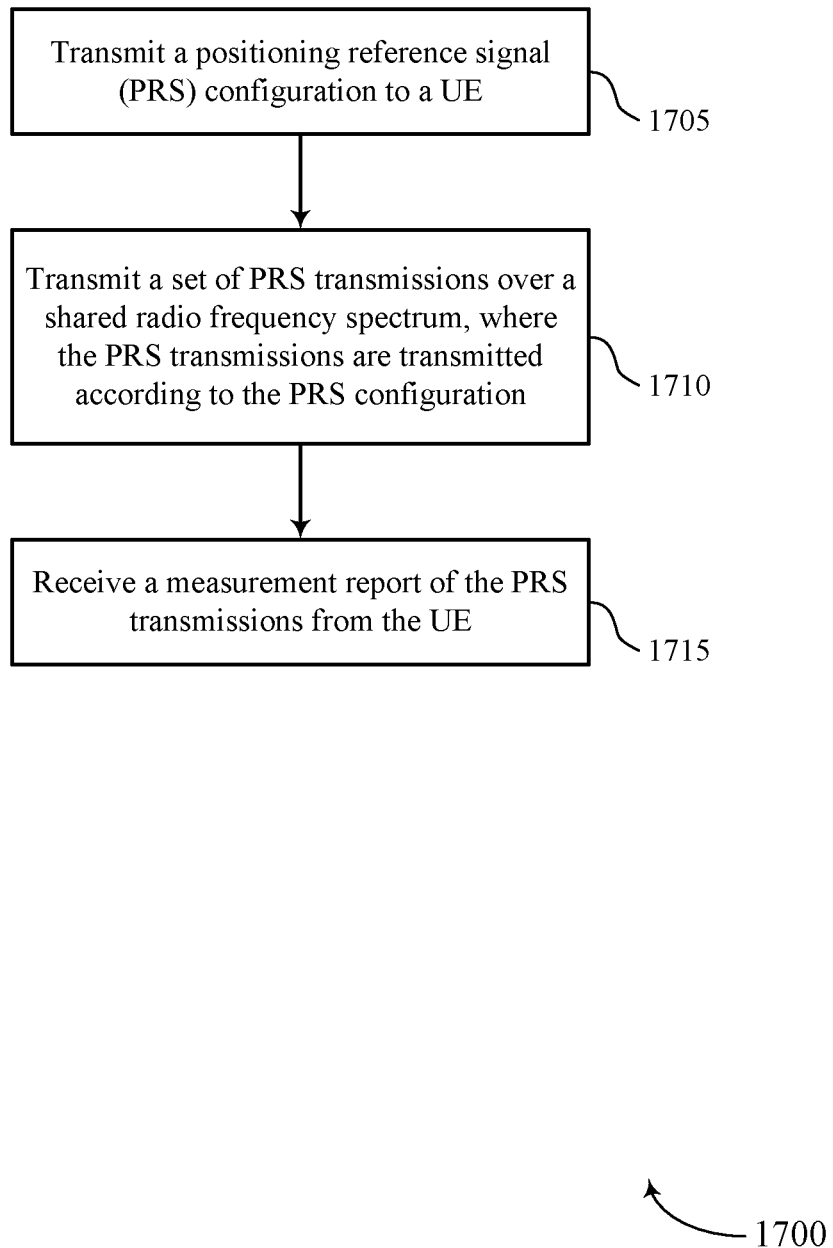

FIG. 17 shows a flowchart illustrating a method 1700 for positioning techniques in wireless communication systems in accordance with aspects of the present disclosure. The operations of method 1700 may be implemented by a base station 105 or its components as described herein. For example, the operations of method 1700 may be performed by a base station positioning manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may transmit a PRS configuration to a UE. The operations of block 1705 may be performed according to the methods described herein. In certain examples, aspects of the operations of block 1705 may be performed by a configuration component as described with reference to FIGS. 11 through 14, which may operate in cooperation with a transmitter 1120 or 1220 as described with reference to FIG. 11 or 12, or antenna(s) 1440 and transceiver(s) 1435 as described with reference to FIG. 14.

At block 1710 the base station 105 may transmit a plurality of PRS transmissions over a shared radio frequency spectrum, where the PRS transmissions are transmitted according to the PRS configuration. The operations of block 1710 may be performed according to the methods described herein. In certain examples, aspects of the operations of block 1710 may be performed by a positioning reference signal component as described with reference to FIGS. 11 through 14, which may operate in cooperation with a transmitter 1120 or 1220 as described with reference to FIG. 11 or 12, or antenna(s) 1440 and transceiver(s) 1435 as described with reference to FIG. 14.

At block 1715 the base station 105 may receive a measurement report of the PRS transmissions from the UE. The operations of block 1715 may be performed according to the methods described herein. In certain examples, aspects of the operations of block 1715 may be performed by a measurement component as described with reference to FIGS. 11 through 14, which may operate in cooperation with a receiver 1110 or 1210 as described with reference to FIG. 11 or 12, or antenna(s) 1440 and transceiver(s) 1435 as described with reference to FIG. 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856

(TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a serving cell, a positioning reference signal (PRS) configuration, the PRS configuration comprising a set of hopping frequencies for a plurality of PRS transmissions including at least one hopping frequency within a non-anchor frequency range;
   receiving, from a non-serving cell, at least one of the plurality of PRS transmissions over the at least one hopping frequency within the non-anchor frequency range of a shared radio frequency spectrum, wherein the plurality of PRS transmissions are received according to the PRS configuration; and
   transmitting a measurement report of the plurality of PRS transmissions.

2. The method of claim 1, wherein receiving the plurality of PRS transmissions comprises:
   receiving at least one PRS transmission during a PRS occasion comprising a plurality of repetitions of PRS subframes.

3. The method of claim 2, further comprising:
   performing combining of the plurality of repetitions of PRS subframes within the PRS occasion; and
   detecting a transmission and estimating a delay jointly based at least in part on the combining.

4. The method of claim 1, wherein receiving the PRS configuration comprises:
   receiving a plurality of cell identifiers associated with a plurality of base stations including the serving cell and the non-serving cell.

5. The method of claim 4, further comprising:
   determining a pseudo random hopping pattern of each base station of the plurality of base stations based at least in part on a received cell identifier of each of the plurality of base stations, wherein the at least one of the plurality of PRS transmissions is received in accordance with the determined pseudo random hopping pattern of the non-serving cell.

6. The method of claim 1, wherein receiving the PRS configuration comprises:
   receiving at least one of: a PRS periodicity, a PRS duration, or a time offset associated with one or more of a plurality of base stations.

7. The method of claim 6, wherein the PRS periodicity is greater than a hopping frame periodicity of a plurality of base stations.

8. The method of claim 1, wherein receiving the plurality of PRS transmissions comprises:
   tuning away from the serving cell during a measurement gap associated with measuring at least one of the PRS transmissions.

9. The method of claim 1, wherein receiving the at least one of the plurality of PRS transmissions comprises:
   receiving all PRS transmissions from a plurality of base stations including the non-serving cell on non-anchor hopping frequencies of the set of hopping frequencies in the non-anchor frequency range.

10. The method of claim 1, further comprising:
    receiving at least one of the plurality of PRS transmissions from the serving cell on an anchor hopping frequency of the set of hopping frequencies.

11. The method of claim 1, further comprising:
    receiving at least one of the plurality of PRS transmissions immediately before or after a serving cell transmission on a non-anchor hopping frequency of the set of hopping frequencies in the non-anchor frequency range.

12. The method of claim 1, further comprising:
    receiving at least one of the plurality of PRS transmissions from multiple ones of a plurality of base stations including the serving cell during a same set of one or more subframes of an anchor hopping frequency of the set of hopping frequencies.

13. The method of claim 1, wherein the non-serving cell comprises a dedicated reference signal base station.

14. A method for wireless communication at a base station, comprising:
    transmitting a positioning reference signal (PRS) configuration to a user equipment (UE), the PRS configuration comprising a set of hopping frequencies for a plurality of PRS transmissions including at least one hopping frequency within a non-anchor frequency range;
    transmitting at least one of the plurality of PRS transmissions over the at least one hopping frequency within the non-anchor frequency range of a shared radio frequency spectrum, wherein at least one of the plurality of PRS transmissions is transmitted according to the PRS configuration; and
    receiving a measurement report of the plurality of PRS transmissions from the UE.

15. The method of claim 14, wherein transmitting the PRS configuration comprises:
    transmitting a cell identifier associated with the base station.

16. The method of claim 14, wherein transmitting the PRS configuration comprises:

transmitting at least one of: a PRS periodicity, a PRS duration, or a time offset.

17. The method of claim 14, wherein the base station is a serving cell.

18. The method of claim 14, wherein the base station is a dedicated reference signal base station.

19. The method of claim 14, wherein transmitting the at least one of the plurality of PRS transmissions comprises:
transmitting all PRS transmissions on non-anchor hopping frequencies of the set of hopping frequencies in the non-anchor frequency range.

20. The method of claim 14, further comprising:
transmitting at least one of the plurality of PRS transmissions on an anchor hopping frequency of the set of hopping frequencies.

21. An apparatus for wireless communication, comprising:
a processor;
memory in electronic communication with the processor; and
instructions stored in the memory and operable, when executed by the processor, to cause the apparatus to:
receive, from a serving cell, a positioning reference signal (PRS) configuration, the PRS configuration comprising a set of hopping frequencies for a plurality of PRS transmissions including at least one hopping frequency within a non-anchor frequency range;
receive, from a non-serving cell, at least one of the plurality of PRS transmissions over the at least one hopping frequency within the non-anchor frequency range of a shared radio frequency spectrum, wherein the plurality of PRS transmissions are received according to the PRS configuration; and
transmit a measurement report of the plurality of PRS transmissions.

22. The apparatus of claim 21, wherein the instructions to receive the plurality of PRS transmissions comprise instructions executable by the processor to:
receive at least one PRS transmission during a PRS occasion comprising a plurality of repetitions of PRS subframes.

23. The apparatus of claim 22, wherein the instructions are further executable by the processor to:
perform combining of the plurality of repetitions of PRS subframes within the PRS occasion; and
detect a transmission and estimate a delay jointly based at least in part on the combining.

24. An apparatus for wireless communication, comprising:
a processor;
memory in electronic communication with the processor; and
instructions stored in the memory and operable, when executed by the processor, to cause the apparatus to:
transmit a positioning reference signal (PRS) configuration to a user equipment (UE), the PRS configuration comprising a set of hopping frequencies for a plurality of PRS transmissions including at least one hopping frequency within a non-anchor frequency range;
transmit at least one of the plurality of PRS transmissions over the at least one hopping frequency within the non-anchor frequency range of a shared radio frequency spectrum, wherein the plurality of PRS transmissions are transmitted according to the PRS configuration; and
receive a measurement report of the plurality of PRS transmissions from the UE.

25. The apparatus of claim 24, wherein the instructions to transmit the PRS configuration comprise instructions executable by the processor to:
transmit a cell identifier associated with a base station.

* * * * *